(12) United States Patent
Phillips et al.

(10) Patent No.: US 12,219,210 B2
(45) Date of Patent: *Feb. 4, 2025

(54) CULTURAL DISTANCE PREDICTION SYSTEM FOR MEDIA ASSET

(71) Applicant: Spherex, Inc., Santa Clara, CA (US)

(72) Inventors: Teresa Ann Phillips, Los Altos, CA (US); Pranav Anand Joshi, Cerritos, CA (US); Kira Michelle McStay, Los Angeles, CA (US)

(73) Assignee: SPHEREX, INC., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/587,631

(22) Filed: Feb. 26, 2024

(65) Prior Publication Data

US 2024/0267590 A1 Aug. 8, 2024

Related U.S. Application Data

(63) Continuation of application No. 18/054,370, filed on Nov. 10, 2022, now Pat. No. 11,917,245, which is a
(Continued)

(51) Int. Cl.
*H04N 21/45* (2011.01)
*G06F 16/29* (2019.01)
(Continued)

(52) U.S. Cl.
CPC ......... *H04N 21/4524* (2013.01); *G06F 16/29* (2019.01); *G06F 18/22* (2023.01);
(Continued)

(58) Field of Classification Search
CPC .......... H04N 21/4524; H04N 21/2353; H04N 21/44222; G06N 20/00; G06F 16/29; G06F 18/22
See application file for complete search history.

(56) References Cited

U.S. PATENT DOCUMENTS 7,958,457 B1 * 6/2011 Brandenberg ........ G06F 1/1613
715/811
9,674,579 B1 * 6/2017 Jaini .................. H04N 21/4668
(Continued)

FOREIGN PATENT DOCUMENTS

WO 2022256093 12/2022

OTHER PUBLICATIONS

"U.S. Appl. No. 17/336,229, Non Final Office Action mailed Apr. 25, 2022", 11 pgs.
(Continued)

*Primary Examiner* — Nicholas T Corbo
(74) *Attorney, Agent, or Firm* — SCHWEGMAN LUNDBERG & WOESSNER, P.A.

(57) ABSTRACT

Various embodiments described herein support or provide for cultural distance prediction operations of a media asset, such as determining events in a media asset, determining geographical region corresponding to the culture of origin and the culture of destination, accessing weight values of cultural attribute categories respectively associated with the geographical regions of the culture of origin and the culture of destination, generating cultural distance score of events, and causing display of the cultural distance score on a user interface of a client device.

20 Claims, 11 Drawing Sheets

CULTURE DISTANCE BETWEEN CULTURE OF ORIGIN (C1) AND CULTURE OF DESTINATION (C2)

| | CULTURAL ARTIFACTS C1/C2 | LIFE MILESTONES C1/C2 | INTERPERSONAL DYNAMICS C1/C2 | SOCIAL INFLUENCE C1/C2 | MORAL VALUES C1/C2 | PROTECTIONISM C1/C2 | GLOBAL STANDING C1/C2 | COMPOSITE SCORE |
|---|---|---|---|---|---|---|---|---|
| EVENT | 10 | 25 | 10 | 30 | 15 | 20 | 15 | 20 |
| SCENE | 15 | 702 20 | 15 | 25 | 20 | 20 | 15 | 20 |
| THEME | 15 | 15 | 10 | 20 | 20 | 15 | 20 | 15 |
| GENRE | 20 | 20 | 15 | 20 | 15 | 20 | 20 | 18 |

DISTANCE SCALE: CONGRUENT (0-20) >COMPLEMENTARY (21-40) >CONVERGENT (41-60) CONFLICTING (61-80) >COMBUSTIBLE (81-100) | PREDICTED SCORE | 19

Related U.S. Application Data continuation of application No. 17/336,229, filed on Jun. 1, 2021, now Pat. No. 11,523,181.

(51) Int. Cl.
*G06F 18/22* (2023.01)
*G06N 20/00* (2019.01)
*H04N 21/235* (2011.01)
*H04N 21/442* (2011.01)

(52) U.S. Cl.
CPC ......... *G06N 20/00* (2019.01); *H04N 21/2353* (2013.01); *H04N 21/44222* (2013.01)

(56) References Cited

U.S. PATENT DOCUMENTS

| | | | |
|---|---|---|---|
| 10,643,074 | B1 | 5/2020 | Mcaninly et al. |
| 10,848,791 | B1 | 11/2020 | Germano et al. |
| 10,897,649 | B1 * | 1/2021 | Germano ............... G06N 20/00 |
| 10,897,658 | B1 | 1/2021 | Sethu et al. |
| 11,523,181 | B1 | 12/2022 | Phillips et al. |
| 11,917,245 | B2 | 2/2024 | Phillips et al. |
| 2022/0385974 | A1 | 12/2022 | Phillips et al. |
| 2023/0106218 | A1 | 4/2023 | Phillips et al. |

OTHER PUBLICATIONS

"U.S. Appl. No. 17/336,229, Notice of Allowance mailed Aug. 3, 2022", 8 pgs.

"U.S. Appl. No. 17/336,229, Response filed Jun. 16, 2022 to Non Final Office Action mailed Apr. 25, 2022", 10 pgs.

"U.S. Appl. No. 18/054,370, Notice of Allowance mailed Oct. 25, 2023", 9 pgs.

"U.S. Appl. No. 18/054,370, Preliminary Amendment filed Dec. 8, 2022".

"International Application Serial No. PCT/US2022/025676, International Search Report mailed May 17, 2022", 2 pgs.

"International Application Serial No. PCT/US2022/025676, Written Opinion mailed May 17, 2022", 5 pgs.

"International Application Serial No. PCT US2022 025676, International Preliminary Report on Patentability mailed Dec. 14, 2023", 7 pgs.

"Korean Application Serial No. 10-2023-7045412, Notice of Preliminary Rejection mailed Jan. 31, 2024", with English translation, 4 pages.

"European Application Serial No. 22816613.8, Response to Communication pursuant to Rules 161(2) and 162 EPC filed Jun. 6, 2024", 15 pgs.

"Australian Application Serial No. 2022286823, First Examination Report mailed Aug. 10, 2024", 3 pgs.

* cited by examiner

CULTURE DISTANCE BETWEEN CULTURE OF ORIGIN (C1) AND CULTURE OF DESTINATION (C2)

| | CULTURAL ARTIFACTS C1/C2 | LIFE MILESTONES C1/C2 | INTERPERSONAL DYNAMICS C1/C2 | SOCIAL INFLUENCE C1/C2 | MORAL VALUES C1/C2 | PROTECTIONISM C1/C2 | GLOBAL STANDING C1/C2 | COMPOSITE SCORE |
|---|---|---|---|---|---|---|---|---|
| EVENT | 10 — 702 | 25 | 10 | 30 | 15 | 20 | 15 | 20 |
| SCENE | 15 | 20 | 15 | 25 | 20 | 20 | 15 | 20 |
| THEME | 15 | 15 | 10 | 20 | 20 | 15 | 20 | 15 |
| GENRE | 20 | 20 | 15 | 20 | 15 | 20 | 20 | 18 |

PREDICTED SCORE: 19

DISTANCE SCALE: CONGRUENT (0-20) >COMPLEMENTARY (21-40) >CONVERGENT (41-60) >CONFLICTING (61-80) >COMBUSTIBLE (81-100)

CULTURAL DISTANCE PREDICTION SYSTEM FOR MEDIA ASSET

RELATED APPLICATIONS

This application is a continuation of U.S. patent application Ser. No. 18/054,370, filed Nov. 10, 2022, which is a continuation of U.S. patent application Ser. No. 17/336,229, filed Jun. 1, 2021, which application is incorporated herein by reference in its entirety.

TECHNICAL FIELD

The present disclosure generally relates to media assets, and, more particularly, various embodiments described herein provide for systems, methods, techniques, instruction sequences, and devices that facilitate cultural distance prediction for a media asset, such as an audio asset or a video asset, based on a multi-dimensional hierarchy of cultural attributes associated with a geographical region where the media asset is generated, and a geographical region where the media asset is targeted for release.

BACKGROUND

The Media and Entertainment industry is experiencing unprecedented global growth in content creation, distribution, and consumption. Film and television content created in one country can now seek distribution in over two hundred countries and territories and can be enjoyed by worldwide audiences of various cultural backgrounds. The linguistic challenge is not the only challenge for targeting overseas markets, that adapting media content distributed to audiences of different cultural backgrounds presents another barrier to success.

The worldwide number of film and television content released annually is growing exponentially. The rapid growth makes it difficult for humans alone to accurately and consistently adjust content based on local culture for distribution. Finding solutions for these challenges requires deep domain expertise in Media and Entertainment, understanding of the cultural differences (e.g., cultural distances) and complexities of the global regulatory environment, and a vision for properly engineered and trained machine learning ("ML") and artificial intelligence ("AI") systems. All of these solutions may help with increasing the cultural appeal of the distributed content to audiences in a distributed region different from a region where the content is created.

BRIEF DESCRIPTION OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some embodiments are illustrated by way of example, and not limitation, in the figures of the accompanying drawings.

FIG. 8 illustrates an example graphical user interface showing a cultural distance score generated for a media asset and scores generated for one or more events, scenes, themes, and genres of the media asset, according to various embodiments.

DETAILED DESCRIPTION

Figure 1:
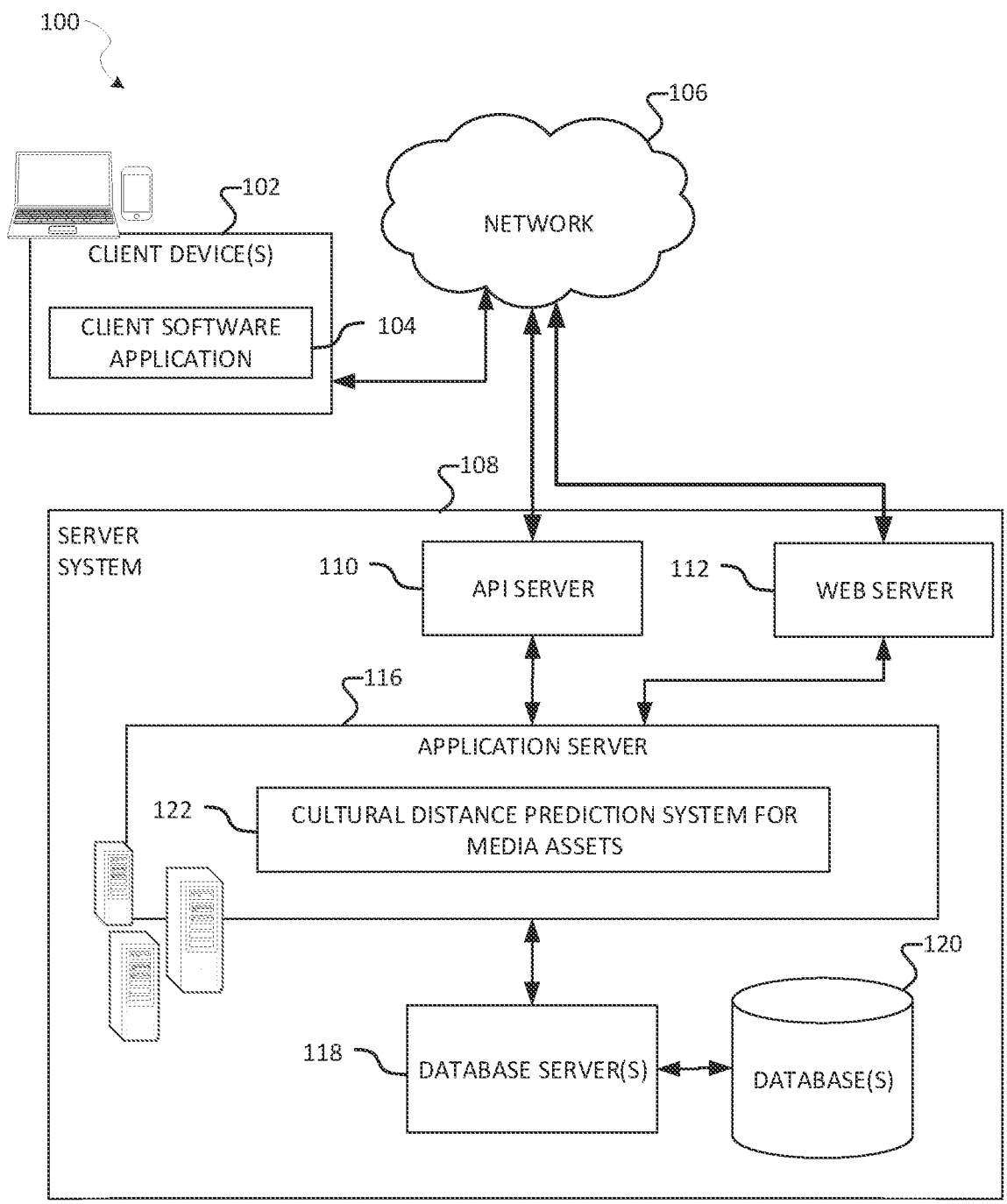
FIG. 1 is a block diagram showing an example data system that includes a cultural distance prediction system for media assets, according to various embodiments.

A successful global distribution strategy for media assets requires the content to be localized for each distributed region, so that it is appropriate and enjoyable to be consumed by local audiences of various cultural backgrounds. A solution for cultural distance prediction is an important tool for the content providers (e.g., content recommendation platform providers) to determine if marketing content and the associated media asset should be adjusted to increase the cultural appeal to audiences in a distributed region different from a region where the media asset was created.

Culture encompasses the social behavior and norms found in human societies, including beliefs, behaviors, languages, practices, expressions, and other characteristics shared by groups of people within a specific timeframe considered unique to members of a specific ethnicity, race, or national origin. Cultural attributes may differ largely between two regions (or countries). The differences at the region- or culture-level are used to determine cultural distance.

One of the major challenges presented for content providers is to provide appropriate, personalized, and enjoyable content for audiences. Content providers attempt to recommend customized content based on user interests, watching history, genre preferences to improve user experience. Empirical studies indicate that one of the most important factors to consider when personalizing content is cultural identity, representing a user's cultural origin and belonging. Cultural identity serves as a more robust indicator when determining if a given content is appealing to a user of specific cultural background. A cultural distance score generated based on attributes, such as cultural attributes of the regions where the content is created and where it is distributed, serves as a strong factor in the content personalization decision process for each user. So far, no existing content recommendation system provides a cultural identity-based content personalization solution for users, assisted by the cultural distance prediction system, as described herein.

Various embodiments described herein address these and other deficiencies of the conventional art. For example, various embodiments described herein can use state-of-art machine-learning (ML) and artificial intelligence (AI) to analyze and process millions of hours of video content created daily in order to effectively identify events, scenes, themes, tropes, and genres of media assets, determine cultural attributes of regions associated with the media assets, and generates cultural distance scores for each identified events, scenes, themes, tropes, and genres.

In various embodiments, a cultural distance prediction system may access content data of a given media asset. The media asset, such as an audio asset or a video asset, may be associated with a culture of origin, corresponding to a geographical region where the content is created. The media asset may also be associated with a culture of destination, corresponding to a geographical region where it is scheduled to be distributed or released. The cultural distance prediction system may determine an event at a given timestamp based on the content data of the media asset. Content data may include visual, audio, text, speech content, or some combination thereof, presented by the media asset. Based on the content data or context data of the media asset, the event is determined to be relevant to a cultural attribute category. The cultural attribute category corresponds to a multi-dimensional hierarchy of cultural attributes customized to each geographical region of distribution.

In various embodiments, the cultural distance prediction system may identify a first geographical region corresponding to the culture of origin and a second geographical region corresponding to the culture of destination. For example, the first geographical region may be the United States, where the media asset was created. The second geographical region may be Japan, where the media asset is scheduled to be distributed or released.

In various embodiments, the cultural distance prediction system may access a first weight value of the cultural attribute category associated with the first geographical region. In various embodiments, the cultural distance prediction system may access a second weight value of the cultural attribute category associated with the second geographical region. In various embodiments, the first weight value and the second weight value may be pre-determined absolute values, determined based on data available for the respective geographical regions. In various embodiments, weight values of cultural attributes may be pre-assigned or pre-determined based on data readily available to the cultural distance prediction system. In various embodiment, pre-determined values are determined based on data curated or transformed from regional artifacts, such as cultural attributes of the corresponding category in a specific geographical region.

In various embodiments, the cultural distance prediction system may use a machine learning algorithm to generate a cultural distance score of the identified event, based on the first weight value, the second weight value, and context data of the event. Different types of machine learning algorithms include, without limitation, decision tree algorithm, random forest algorithm, graph neural network algorithm, matrix factorization algorithm, logistic regression algorithm, or scalable vector machines algorithm.

In various embodiments, the context data of the event is determined based on content data of the event, or content data of the media asset. In various embodiments, the cultural distance prediction system may cause the display of a cultural distance score of the event on a user interface of a client device. In various embodiments, for a single identified event from the media asset, the cultural distance prediction system may calculate cultural distance scores for each category of cultural attributes, including cultural artifacts, life milestones, interpersonal dynamics, social influence, moral values, protectionism, global standing, etc. The cultural distance prediction system may generate a composite score for the event based on a median or average score of all the scores calculated for each category. In various embodiments, as soon as a composite score is generated for each identified event, scene, theme, and genre, the cultural distance prediction system may generate an overall predicted cultural distance score for the media asset. In various embodiments, the cultural distance prediction system may determine a level of predicted appeal of the event by an audience of the culture of destination based on a value of the cultural distance score.

For some embodiments, a distance scale is utilized to indicate the level of cultural distance or a level of predicted appeal of a media asset, or an event, scene, theme, trope, genre, or a subgenre associated therewith, between two geographical regions. The distance scale indicates levels, including congruent (0-20), complementary (21-40), convergent (41-60), conflicting (61-80), and combustible (81-100). The greater value indicates the greater difference between cultures. The cultural distance prediction system may cause the display of scores and distance scales on a user interface of a client device, as shown in FIG. 8, as an example.

Figure 5:
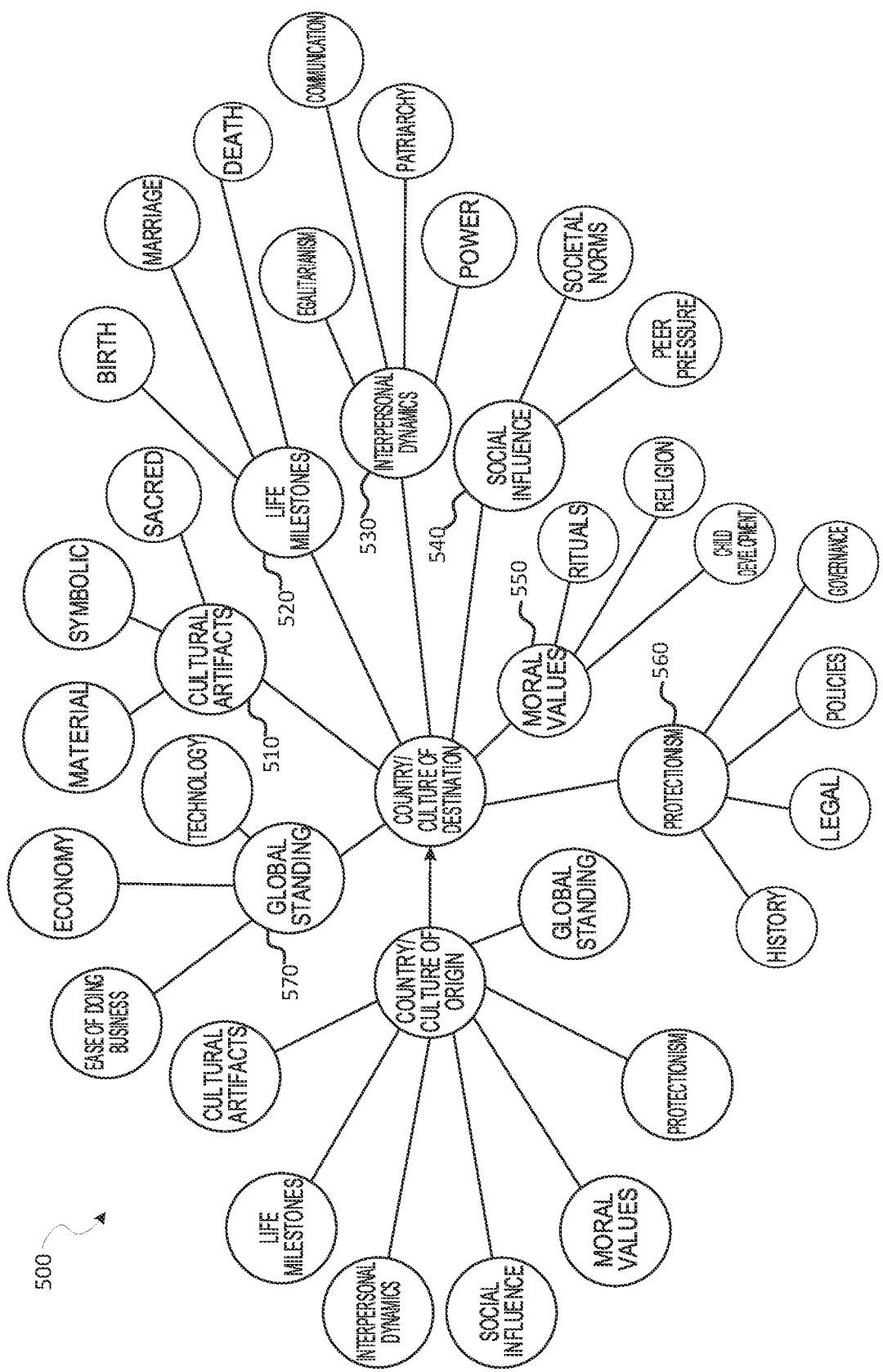
FIG. 5 is a block diagram illustrating example cultural attribute categories in a multi-dimensional hierarchy of cultural attributes based on a predetermined cultural attributes classification ontology or taxonomy, according to various embodiments.

Various embodiments enable classification and subclassification of cultural attributes based on classes and subclasses defined by a predetermined cultural attributes classification ontology or taxonomy. A cultural attribute category may represent a class or a subclass in the cultural attribute classification ontology/taxonomy. A cultural attribute category may include cultural attributes that are specific to a culture of a geographical region. In various embodiments, the classes of the cultural attribute classification ontology/taxonomy may include cultural artifacts, life milestones, interpersonal dynamics, social influence, moral values, protectionism, and global standing, as illustrated in FIG. 5.

In various embodiments, the cultural attribute prediction system may determine the most relevant class and subclass in the cultural attribute classification ontology/taxonomy based on context data of the event or the context data of the media asset.

As used herein, a media asset can comprise a video asset, a video content item, an audio asset, or an audio content item. As used herein, a cultural distance score can comprise a numerical value, which may or may not be selected on a scale. Likewise, a feedback score can comprise a numerical value, which may or may not be selected on a scale. As used herein, an event can comprise an audio content element (e.g., music, background noise, etc.), a visual content element (e.g., video, visual effects, colors, etc.), a textual content element (e.g., subtitles), a speech content element (e.g., dialog during an event or over a scene), or some combination thereof, that occurs within (e.g., is presented by) content of a media asset at a particular point on a timeline (e.g., a particular timestamp or timecode) of the media asset. For instance, a given event can comprise one or more of noise generated, music played, items displayed, actions or activity displayed by an actor, or words spoken. As used herein, an emotional event can refer to an event that has the possibility of invoking an emotional response in an audience member who observes or experiences the event.

As used herein, a scene can comprise multiple events that occur within (e.g., are presented by) content of a media asset over a duration of a timeline (e.g., a range of timestamps or timecodes) of the media asset. As used herein, timestamp and timecode are used interchangeably.

As used herein, a machine-learning (ML) model can comprise any predictive model that is generated based on (or that is trained on) training data. Once generated/trained, a machine-learning model can receive one or more inputs (e.g., one or more features) and generate an output for the inputs based on the model's training. Different types of machine-learning models include, without limitation, ones trained using supervised learning, unsupervised learning, reinforcement learning, or deep learning (e.g., complex neural networks).

Reference will now be made in detail to embodiments, examples of which are illustrated in the appended drawings. The present disclosure may, however, be embodied in many different forms and should not be construed as being limited to the embodiments set forth herein.

FIG. 1 is a block diagram showing an example data system 100 that includes a cultural distance prediction system for media assets (hereafter, the cultural distance prediction system 122), according to various embodiments. By including the cultural distance prediction system 122, the data system 100 can facilitate cultural distance prediction of a media asset as described herein, which in turn can enable the generation of cultural distance prediction scores for the content, including the associated events and scenes, and scores for the content associated characteristics, including themes, tropes, and genres. In particular, a user at the client device 102 can access the cultural distance prediction system 122 (e.g., via a graphical user interface presented on a software application on the client device 102) and use the cultural distance prediction system 122 to generate cultural distance prediction scores for a media asset (e.g., video asset or audio asset) selected by the user.

As shown, the data system 100 includes one or more client devices 102, a server system 108, and a network 106 (e.g., including Internet, wide-area-network (WAN), local-area-network (LAN), wireless network, etc.) that communicatively couples them together. Each client device 102 can host a number of applications, including a client software application 104. The client software application 104 can communicate data with the server system 108 via a network 106. Accordingly, the client software application 104 can communicate and exchange data with the server system 108 via network 106.

The server system 108 provides server-side functionality via the network 106 to the client software application 104. While certain functions of the data system 100 are described herein as being performed by the cultural distance prediction system 122 on the server system 108, it will be appreciated that the location of certain functionality within the server system 108 is a design choice. For example, it may be technically preferable to initially deploy certain technology and functionality within the server system 108, but to later migrate this technology and functionality to the client software application 104 where the client device 102 provides cultural distance prediction operations, such as determining (e.g., identifying) events in a media asset, determining (e.g., identifying) geographical region corresponding to the culture of origin and the culture of destination, receiving (e.g., accessing) weight values of cultural attribute categories respectively associated with the geographical regions of the culture of origin and the culture of destination, generating cultural distance score of events, and causing display of the cultural distance score on a user interface of the client device 102.

The server system 108 supports various services and operations that are provided to the client software application 104 by the cultural distance prediction system 122. Such operations include transmitting data from the cultural distance prediction system 122 to the client software application 104, receiving data from the client software application 104 to the cultural distance prediction system 122, and the cultural distance prediction system 122 processing data generated by the client software application 104. Data exchanges within the data system 100 may be invoked and controlled through operations of software component environments available via one or more endpoints, or functions available via one or more user interfaces of the client software application 104, which may include web-based user interfaces provided by the server system 108 for presentation at the client device 102.

With respect to the server system 108, each of an Application Program Interface (API) server 110 and a web server 112 is coupled to an application server 116, which hosts the cultural distance prediction system 122. The application server 116 is communicatively coupled to a database server 118, which facilitates access to a database 120 that stores data associated with the application server 116, including data that may be generated or used by the cultural distance prediction system 122.

The API server 110 receives and transmits data (e.g., API calls, commands, requests, responses, and authentication data) between the client device 102 and the application server 116. Specifically, the API server 110 provides a set of interfaces (e.g., routines and protocols) that can be called or queried by the client software application 104 in order to invoke the functionality of the application server 116. The API server 110 exposes various functions supported by the application server 116 including, without limitation: user registration; login functionality; data object operations (e.g., generating, storing, retrieving, encrypting, decrypting, transferring, access rights, licensing, etc.); and user communications.

Through one or more web-based interfaces (e.g., web-based user interfaces), the web server 112 can support various functionality of the cultural distance prediction system 122 of the application server 116 including, without limitation: screening content of a media asset; or identifying cultures of origin and destination, accessing weight values of the cultural attribute category, generating cultural distance score using machine learning algorithms.

The application server 116 hosts a number of applications and subsystems, including the cultural distance prediction system 122, which supports various functions and services with respect to various embodiments described herein.

The application server 116 is communicatively coupled to a database server 118, which facilitates access to database(s) 120 in which may be stored data associated with the cultural distance prediction system 122. Data associated with the cultural distance prediction system 122 can include, without limitation, data describing one or more events identified in content of a media asset, one or more event classification labels identified for events, one or more event subclassification labels identified for events, one or more scenes identified in the content of the media asset, one or more scene attributes for scenes, one or more themes identified in the content of the media asset, and one or more title-level attributes (hereafter, title attributes) for the media asset.

Figure 2:
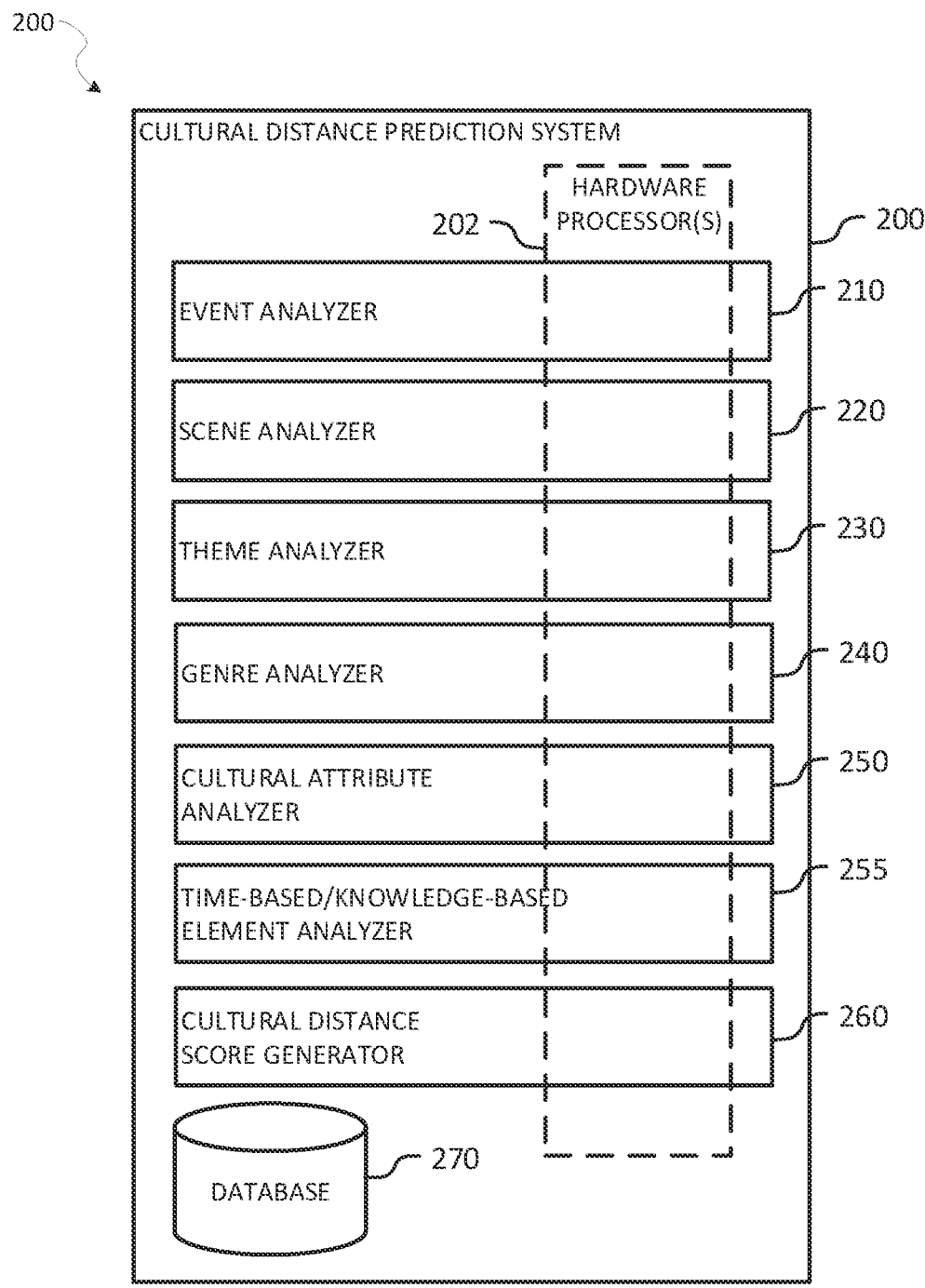
FIG. 2 is a block diagram illustrating an example cultural distance prediction system for media assets, according to various embodiments.

FIG. 2 is a block diagram illustrating an example cultural distance prediction system 200 for media assets, according to various embodiments. For some embodiments, the cultural distance prediction system 200 represents an example of the cultural distance prediction system 100 described with respect to FIG. 1. As shown, the cultural distance prediction system 200 comprises an event analyzer 210, a scene analyzer 220, a theme analyzer 230, a genre analyzer 240, a cultural attribute analyzer 250, a time-based and knowledge-based element analyzer 255, a cultural distance score generator 260, and a database 270. According to various embodiments, one or more of the event analyzer 210, scene analyzer 220, theme analyzer 230, genre analyzer 240, cultural attribute analyzer 250, time-based and knowledge-based element analyzer 255, and cultural distance score generator 260 are implemented by one or more hardware processors 202. Data (e.g., contextual data for a media asset) generated by one or more of the event analyzer 210, the scene analyzer 220, the theme analyzer 230, the genre analyzer 240, the cultural attribute analyzer 250, the time-based and knowledge-based element analyzer 255, and the cultural distance score generator 260 may be stored in the database 270 of the cultural distance prediction system 200.

The event analyzer 210 is configured to determine (e.g., identify) one or more events within content data of a media asset by the cultural distance prediction system 200. For some embodiments, the event analyzer 210 determines at least one event (of the one or more events) within the content data by scanning the content data for events that relate to at least one event classification and automatically identifies at least one event in the content data. Alternatively, or in addition, for some embodiments, the event analyzer 210 determines at least one event (of the one or more events) within the content data by receiving one or more user selections of at least one of the one or more events within the content data. For example, a graphical user interface can be displayed at a client device (e.g., 102), where the graphical user interface can enable a user (e.g., human reviewer, system administrator) at the client device to screen the content data of the media asset (e.g., via a panel or window with a timeline and content player controls). As the user screens the content data through the graphical user interface, the user can submit one or more user inputs to identify an occurrence of an event at a particular timestamp (or timecode). In various embodiments, the event analyzer 210 may determine (e.g., identify) an event based on a set of signals provided by at least one computer vision analysis (e.g., video, visual effects, colors, etc.), audio analysis (e.g., speech/dialog, music, background noise), or natural language processing (NLP) of content (e.g., subtitles) presented by the current media asset. For instance, the event analyzer 210 can determine an event being relevant to cultural attributes of religious practice.

The scene analyzer 220 is configured to determine (e.g., identify) one or more scenes within content data of a media asset, where each scene comprises one or more events (e.g., a plurality of events determined by the event analyzer 210). Additionally, scene analyzer 220 can be configured to determine (e.g., identify) one or more scene attributes for at least one of the one or more scenes. For various embodiments, a given scene attribute for a given scene can be determined based on events that compose the scene. For instance, one or more scene attributes for a given scene can be based on at least one of: one or more events of the given scene; one or more event classification labels for the one or more events; or one or more event subclassification labels for the one or more events. Examples of scene attributes can include, without limitation: a frequency of events within a given scene; a mixture of events of different event classification labels within the given scene; a distance between two events within the given scene; a duration of the given scene; whether the scene is direct, explicit, implied; and an aftermath. In various embodiments, the scene analyzer 220 determines (e.g., identifies) at least one scene within the content data, at least one scene attribute, or both by receiving one or more user selections of at least one scene or scene attribute.

The theme analyzer 230 is configured to determine (e.g., identify) one or more themes of a media asset based on at least one or more events, scenes, or scene attributes. For various embodiments, a given theme can be determined based on at least one of the set of scenes or the set of scene attributes. Examples of themes can include, without limitation, theme type (e.g., coming of age context, good versus evil context, etc.), and attributes that explain dimensions of the theme (e.g., does the theme involve the main character, is the theme imitable, is the theme reproducible). For some embodiments, the theme analyzer 230 determines (e.g., identifies) at least one theme for the media asset by receiving one or more user selections of at least one theme. For example, a graphical user interface can be displayed at a client device (e.g., 102), where the graphical user interface can enable a user (e.g., human reviewer) at the client device to identify one or more themes for the media asset. In various embodiments, the theme analyzer 230 is also configured to determine one or more tropes of media assets based on at least one or more events, scenes, or themes.

The genre analyzer 240 is configured to determine (e.g., identify) one or more genre or subgenre of media assets based on at least one or more one or more events, scenes, themes, or tropes. Genre is a category of media assets determined based on a set of stylistic criteria. Examples of genre may include, action, adventure, comedy, crime and mystery, fantasy, historical, horror, romance, satire, science fiction, speculative, thriller, etc. A subgenre may be a subordinate within a genre. Two events or scenes within a media asset being the same genre may still sometimes differ in subgenre. For example, if a comedy scene has darker and more frightening elements of comedy, it would belong in the subgenre of dark comedy. As another example, a comedy story that features a romantic story would belong to the subgenre of a romantic comedy. A graphical user interface can be displayed at a client device (e.g., 102), where the graphical user interface can enable a user (e.g., human reviewer, system administrator) at the client device to identify one or more genres or subgenres for the media asset.

The cultural attribute analyzer 250 is configured to determine one or more cultural attribute that is relevant to one or more events, scenes, themes, tropes, genres and subgenres. The cultural attribute analyzer may generate a customized cultural attribute graph for each identified event, scene, theme, trope, genre, and subgenre based on the geographical region relevant to the media asset and one or more cultural attributes available in the multi-dimensional hierarchy of cultural attributes. The multi-dimensional hierarchy of cultural attributes represents the classes of the cultural attribute classification ontology/taxonomy, as illustrated in FIG. 5. The customized cultural attribute graph may be stored in database 270.

The time-based and knowledge-based element analyzer 255 is configured to determine time-based elements and determine knowledge-based (e.g., geographical knowledge-based) elements that are relevant to each identified event, scene, theme, trope, genre, and subgenre. Time-based elements include information associated with the production year, original release year, consumption date, or time period of the content created for the media asset. For some embodiments, knowledge-based elements may be determined based on metadata associated with the media asset. The knowledge-based elements include current policies, laws, or news events associated with the geographical region of the culture of destination. The knowledge-based elements and time-based elements may be updated periodically by the cultural distance prediction system.

The cultural distance score generator 260 is configured to use a machine learning algorithm to generate cultural distance scores for one or more events, scenes, themes, tropes, genres, and subgenres based on the geographical region and one or more cultural attributes. For some embodiments, the cultural distance score generator 260 comprises a machine-learning model that is trained to automatically determine (e.g., identify) a cultural distance score for each event, scene, theme, trope, genre, and subgenre based on each customized cultural attribute graph generated by cultural attribute analyzer 250. Depending on the embodiment, the machine-learning model of the cultural distance score generator 260 can be trained on data previously generated during cultural distance prediction of another media asset (e.g., by the cultural distance prediction system 200). For some embodiments, the machine learning algorithm may be at least one of the decision tree algorithm(s), random forest algorithm, graph neural network (GNN) algorithm, or matrix factorization algorithm.

For some embodiments, the cultural distance score may be generated based on user profiles available to the cultural distance prediction system 200. A user profile may include data such as a user's beliefs, values, and customs, represented by classes of the cultural attribute classification ontology/taxonomy, including cultural artifacts, life milestones, interpersonal dynamics, social influence, moral values, protectionism, and global standing, as illustrated in FIG. 5. The cultural distance score system may adjust the weight value of the most relevant cultural attribute associated with the identified events, scenes, themes, tropes, genres, and subgenres based on the user profile, so that the cultural distance score may be more accurately reflective of the particular user's identity and beliefs.

Figure 3:
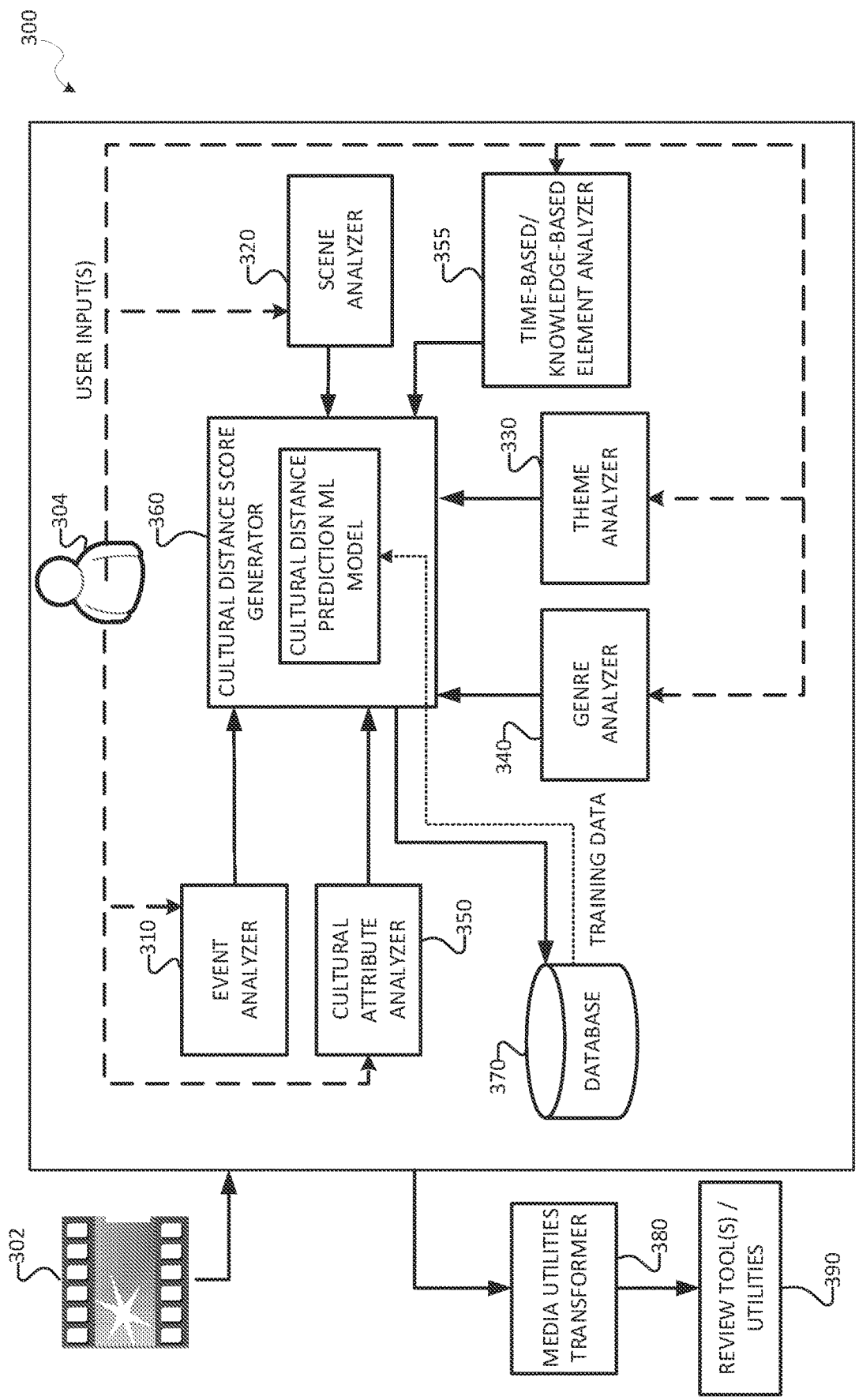
FIG. 3 is a flowchart illustrating data flow within an example cultural distance prediction system for media assets during operation, according to various embodiments.

FIG. 3 is a flowchart illustrating data flow within an example cultural distance prediction system 300 for media assets during operation, according to various embodiments. As shown, the cultural distance prediction system 300 comprises an event analyzer 310, a scene analyzer 320, a theme analyzer 330, a genre analyzer 340, a cultural attribute analyzer 350, a time-based and knowledge-based element analyzer 355, a cultural distance score generator 360, and a database 370. For some embodiments, the event analyzer 310, the scene analyzer 320, the theme analyzer 330, the genre analyzer 340, the cultural attribute analyzer 350, a time-based and knowledge-based element analyzer 355, and the cultural distance score generator 360 are respectively similar to the event analyzer 210, scene analyzer 220, theme analyzer 230, genre analyzer 240, cultural attribute analyzer 250, a time-based and knowledge-based element analyzer 255, and cultural distance score generator 260 of the cultural distance prediction system 200 of FIG. 2. Additionally, each of the event analyzer 310, the scene analyzer 320, the theme analyzer 330, the genre analyzer 340, the cultural attribute analyzer 350, a time-based and knowledge-based element analyzer 355, and the cultural distance score generator 360 can comprise a machine-learning (ML) model that enables or facilitates operation as described herein.

During operations, a media asset 302 (e.g., video media asset) is received and processed respectively by the event analyzer 310, the scene analyzer 320, the theme analyzer 330, the genre analyzer 340, and the cultural attribute analyzer 350, for each event, scene, theme and trope, and genre and subgenre. One or more events, scenes, themes and tropes, and genres and subgenres may also be determined (e.g., identified) by one or more user inputs from a user 304 (e.g., system administrator or a user of a client device).

The event analyzer 310, scene analyzer 320, theme analyzer 330, genre analyzer 340, cultural attribute analyzer 350, and time-based and knowledge-based element analyzer 355, respectively output results to the cultural distance score generator 360 to generate scores for each identified event, scene, theme and trope, and genre and subgenre. The cultural distance score generator 360 is configured to generate cultural distance scores for one or more events, scenes, themes, tropes, genres, and subgenres based on pre-determined weight values of each cultural attribute or cultural attribute category that is applicable to each event, scene, theme, trope, genre, and subgenre. Depending on the embodiment, the machine-learning model of the cultural distance score generator 660 may be trained on data previously generated during cultural distance prediction of another media asset (e.g., by the cultural distance prediction system 200), and may also be trained based on one or more user inputs from the user 304 (e.g., system administrator or a user of a client device).

Cultural distance score for the media asset 302 is generated and stored on the database 370. For some embodiments, the cultural distance scores for the media asset 302 may be generated based on a customized cultural attribute graph comprising cultural attributes (associated with pre-determined weight values) identified by cultural attribute analyzer 350 and based on one of the following: one or more events identified by event analyzer 310, one or more scenes identified by scene analyzer 320, one or more themes or tropes identified by theme analyzer 330, one or more genres or subgenres identified by genre analyzer 340, This cultural distance score for the media asset 302 on the database 370 can be subsequently used by one or more review tools 390, via the assistance of media utilities transformer 380, for further downstream analysis of the media asset 302. For example, using the stored cultural distance score, the review tools 390 can analyze the media asset 302 to: classify content of the media asset 302 for one or more cultures; generate content advisory for the media asset 302; generate a trailer for the media asset 302; generate a title for the media asset 302; perform compliance review on the media asset 302; determine audience segments for the media asset 302; target the media asset 302 for an audience; enable skipping of scenes in the media asset 302; filter content of the media asset 302; or predict cultural appeal or aversion of the media asset 302 with respect to specified culture, country, region, or the like. Each of the above-mentioned downstream analysis corresponds to a utility, including content classification, artwork extraction and modification, content advisory generation, trailer generation, compliance editing, video highlight generation, scene skipping, genre detection, content filtering, cultural relevancy/prediction/distance calculation, deep metadata analysis, culturalized (culture-based) listing generation, title "DNA" analysis, and audience segmentation and targeting.

Depending on the embodiment, content classification can comprise an automated method in which technology is used to screen content of the media asset 302 and automatically generate rating values for the media asset 302 for local markets worldwide. In general, content classification involves screening a film or television show for elements, such as violence, sexuality, or drugs, to determine its suitability for viewers by age group in a specific local market. Age ratings, also known as maturity ratings, can provide the public with the information they need to make informed viewing decisions, as well as protect children from viewing content that may be harmful to them.

Artwork extraction and modification can comprise an automated method in which artwork is extracted from content of the media asset 302, where the artwork selected for extraction is relevant for a promotional utility (e.g., for enhanced click-through rates for the media asset 302 on an digital store that presents the artwork in connection with the media asset 302). In general, media content artwork can comprise a digital poster that is used to promote and advertise content and that is designed to persuade viewers to select content of a media asset.

Content advisory generation can comprise an automated method in which technology is used to generate local content advisories for the media asset 302 accurately and consistently. In general, content advisories, also known as content warnings, can provide detailed information about the types of objectionable content contained in film and television, such as violence, profanity, or drugs.

Trailer generation can comprise an automated method in which a trailer is generated using artificial intelligence and machine-learning technology that indexes and packages the most relevant scenes of content of the media asset 302. In general, a trailer can comprise a commercial advertisement of a video content that is planned for exhibition-usually for films and television shows.

Compliance editing can comprise an automated method in which technology is used to recommend the respective time-code ranges of non-compliant scenes within the media asset 302 for local markets worldwide. In general, content exhibition in local markets can be regulated to ensure compliance with content classification and censorship laws. When a particular content fails to comply with local policies, regulators can require that objectionable scenes be edited accordingly.

Video highlight generation can comprise an automated method for indexing the most relevant scenes of video content of the media asset 302 and generating one or more short video clips from these scenes such that the short video clips appeal to one or more cultural sensitivities or a value system of a local audience (e.g., for the purpose of marketing and promoting the content of the media asset 302).

Scene skipping can comprise an automated method in which time-based markers (e.g., time-code ranges) of the media asset 302 that represent the duration of the objectionable scene are captured and provided to a video/streaming platform, which can enable a feature "Skip Scene" (e.g., a graphical user interface button on the client interface that a viewer can click to skip an objectionable scene).

Genre detection can comprise an automated method for detecting a genre of content of the media asset 302, which can be used for dynamic listing or content promotion/recommendation activities for the media asset 302. In general, genres and sub-genres for media content are categories that define the content based on one or more of its narrative themes.

Content filtering can comprise an automated method in which content (e.g., such as the content of the media asset 302) is suggested a particular viewer at a given time. In general, the filtered content can be displayed in the catalog (e.g., virtual shelves and trays) of a digital streaming platform to persuade a viewer to watch the content.

Cultural relevancy/prediction/distance calculation can comprise an automated method in which a cultural distance is measured between two or more cultures for the purposes of adapting content of the media asset 302 to improve its appeal (e.g., relatability or suitability) with respect to a local audience or to predict its appeal (e.g., relatability or suitability) with respect to the local audience, which can determine the overall success of the media asset 302 in connection with that local audience. The method can consider local laws, customs, or tastes and preferences of the viewing audience in measuring this distance.

Deep metadata analysis can comprise an automated method in which technology is used to generate, for content of the media asset 302, attributes at relevant time-code ranges that describe the content's mood, theme, time period, location, event, objectionable content, character, or another element that is important for enhanced search and discovery. In general, deep metadata regarding content of a media asset can provide definitions that organize content to make it more visible for search engines and streaming platforms.

Culturalized (culture-based) listing generation can comprise an automated method in which a listing of media assets (and the content of each listing element, such as title metadata, artwork, trailer, etc.) is generated based on localization and culturalization. In general, localization can comprise adapting content to a viewer's geographical environment in accordance with language, legal and technology requirements, while culturalization can comprise adapting content of the media asset 302 to a user's cultural environment (e.g., beliefs, values, and customs.).

Title "DNA" analysis can comprise an automated method for generating a core set of instructions that dictate the essence of the content of the media asset 302, which can be used to modify or generate (the context or structure for) title metadata of the media asset 302. In general, title metadata for a media asset can be used to organize, index, analyze, manage, and service the media asset for enhanced distribution and consumption.

Audience segmentation and targeting can comprise an automated method in which consumers can be profiled according to demographics, psychographics, gender, age, ethnicity, or other parameters, and consumers within a target audience or cohort can be identified (e.g., for enhanced marketing promotions and conversions) for the media asset 302.

Dynamic advertising slot (or break) generation can comprise an automated method in which a scene graph for the media asset 302 is generated, where the scene graph can provide details on emotional highs and lows in content (e.g., video content) of the media asset 302 and create time-based markers (aka time-code ranges) corresponding to the peak emotional events in the content of the media asset 302. The time-based markers, along with other deep metadata, can be provided to a video/streaming platform for optimal placement of advertisements for the media asset 302. Dynamic advertising slot/break generation can ensure that advertisements are placed dynamically in content of a media asset at moments that would incur the greatest impact.

Figure 4A:
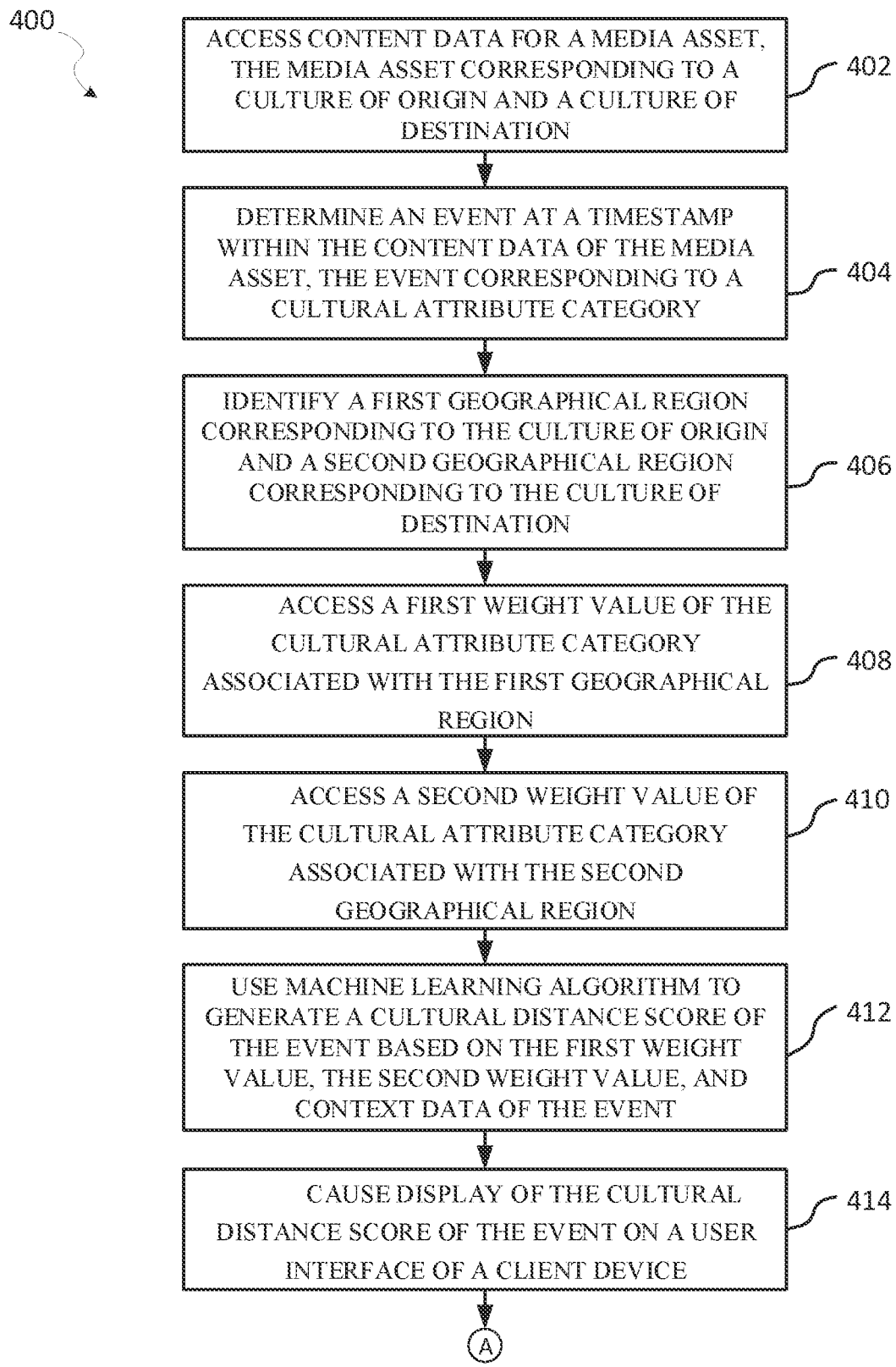
FIGS. 4A-4B are flowcharts illustrating an example method for cultural distance prediction of media assets, according to various embodiments.
Figure 4B:
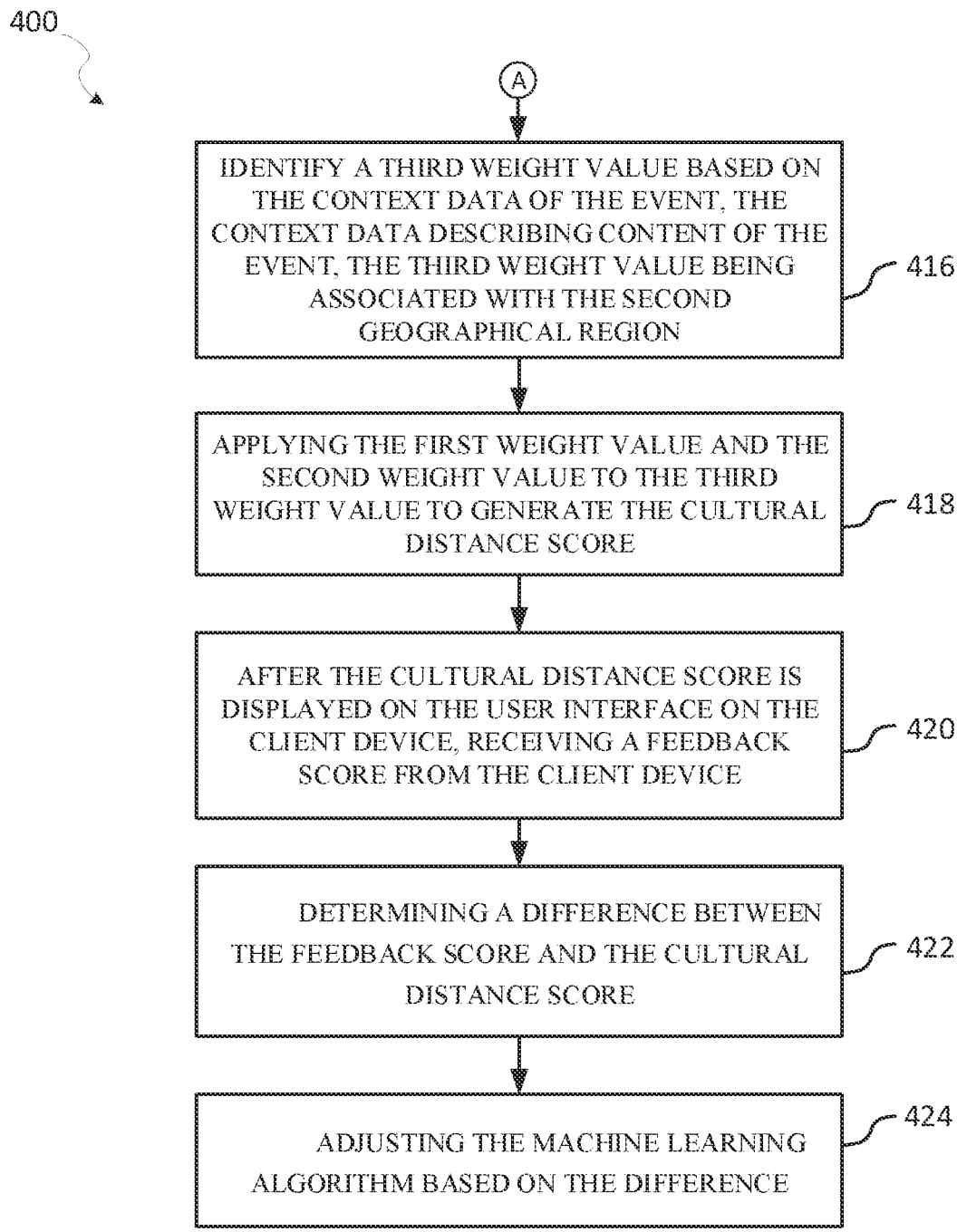

FIGS. 4A-4B are flowcharts illustrating an example method 400 for cultural distance prediction of media assets, according to various embodiments. The operations of method 400 illustrate the generation of cultural distance scores for an identified event based on content data of a media asset. The same or similar operations of a method may be utilized to generate cultural distance scores for an identified scene, theme, trope, genre, and subgenre of a media asset.

For example, methods 400 can be performed by the cultural distance prediction system 122 described with respect to FIG. 1, the cultural distance prediction system 200 described with respect to FIG. 2, the cultural distance prediction system described with respect to FIG. 3, or individual components thereof. An operation of various methods described herein may be performed by one or more hardware processors (e.g., central processing units or graphics processing units) of a computing device (e.g., a desktop, server, laptop, mobile phone, tablet, etc.), which may be part of a computing system based on a cloud architecture. Example methods described herein may also be implemented in the form of executable instructions stored on a machine-readable medium or in the form of electronic circuitry. For instance, the operations of method 400 may be represented by executable instructions that, when executed by a processor of a computing device, cause the computing device to perform the method 400. Depending on the embodiment, an operation of an example method described herein may be repeated in different ways or involve intervening operations not shown. Though the operations of example methods may be depicted and described in a certain order, the order in which the operations are performed may vary among embodiments, including performing certain operations in parallel.

At operation 402, content data for a media asset is accessed by (e.g., using) a processor (e.g., hardware processor operating the cultural distance prediction system 200). The media asset accessed can be one selected for analysis or review (e.g., media asset review). For instance, the media asset can be selected by a user at a client device, such as by way of one or more user inputs to a graphical user interface presented by a standalone software application or a web browser software application. As described herein, examples of a media asset can include, without limitation, audio assets (e.g., music tracks, music albums, etc.) and video assets (e.g., motion pictures, feature films, television episodes, etc.). Depending on the embodiment, the content data can be provided by a media file or datastore associated with the media asset.

At operation 404, the processor may determine an event at a timestamp within the content data of the media asset. The event corresponds to a cultural attribute category. A cultural attribute category may represent a class or a subclass in the cultural attribute classification ontology/taxonomy. A cultural attribute category may include cultural attributes that are specific to a culture of a geographical region. In various embodiments, the classes of the cultural attribute classification ontology/taxonomy may include cultural artifacts, life milestones, interpersonal dynamics, social influence, moral values, protectionism, and global standing, as illustrated in FIG. 5. Each class or category of the cultural attribute classification ontology/taxonomy may include one or more subclasses. For example, subclasses of cultural artifacts may include material, symbolic, and sacred; subclasses of life milestones may include birth, gaining independence, falling in love, marriage, higher education, securing a job, buying real property, experiencing loss, and death; subclasses of interpersonal dynamics may include egalitarianism, patriarchy, power, gender, and communication; subclasses of social influence may include societal norms, peer pressure, imitable behavior, social trust, and threats; subclasses of moral values may include rituals, religion, parenting, child development, and institutions; subclasses of protectionism may include government, politics, military, and history; subclasses of global standing may include geolocation, language, economy, regulatory constraints, technology, and environment. In various embodiments, the cultural attribute prediction system may determine the most relevant class and subclass in the cultural attribute classification ontology/taxonomy based on context data of the event or the context data of the media asset.

At operation 406, the processor identifies a geographical region (e.g., a first geographical region) that corresponds to a culture of origin, and identifies a geographical region (e.g., a second geographical region) that corresponds to a culture of destination. For example, when the selected media asset is a movie produced in the United States, the first geographical region may be the United States, where the media asset was created. The second geographical region may be Japan, where the media asset is scheduled to be distributed or released. The culture of origin is determined to be the culture of the United States, and the culture of destination may be Japanese culture.

At operation 408, the processor accesses a weight value (e.g., a first weight value) that corresponds to a cultural attribute category associated with the geographical region (e.g., the first geographical region) of the culture of origin. The cultural attribute category may be associated with a class or a subclass in the cultural attribute classification ontology/taxonomy that is determined to be most relevant to the event. The determination of relevancy may be based on analyzing the content or context data of the event or the content or context data of the media asset as a whole.

At operation 410, the process accesses a weight value (e.g., a second weight value) that corresponds to the cultural attribute category associated with the geographical region (e.g., the second geographical region) of the culture of destination.

At operation 412, the processor uses a machine learning algorithm to generates a cultural distance score of the event based on the weight value (e.g., a first weight value) corresponds to a cultural attribute category associated with the geographical region (e.g., the first geographical region) of the culture of origin, on the weight value (e.g., a second weight value) corresponds to the cultural attribute category associated with the geographical region (e.g., the second geographical region) of the culture of destination, and on the context data of the event or media asset. For some embodiments, the machine learning algorithm may be at least one of the decision tree algorithm, random forest algorithm, graph neural network (GNN) algorithm, or matrix factorization algorithm.

For some embodiments, weight values of cultural attribute categories and the associated cultural attributes are pre-determined absolute values that are accessible by the cultural distance prediction system 200. The weight values may be updated based on time metadata and knowledge graph. Time metadata may include information associated with time-based elements, including production year, original release year, consumption date, time period of the content of the media asset. Knowledge graph may include information associated with geographical knowledge-based elements, such as local laws, news events, and any other information related to the current cultural and legal compliance environment of a particular geographical region. For some embodiment, a law change in a geographical region will cause an update of the knowledge graph associated with the region, which in turn causes a change to the predetermined weight value of a cultural attribute associated with the region. The detection of changes to the time metadata and knowledge graph may be performed by a human reviewer or by the cultural distance prediction system automatically.

For some embodiments, the processor may access metadata associated with the media asset. The metadata includes time-based elements and geographical knowledge-based elements. Time-based elements include information associated with the production year, original release year, consumption date, or time period of the content created for the media asset. For some embodiments, the processor may access geographical knowledge-based elements based on metadata associated with the media asset. The geographical knowledge-based elements include current policies, laws, or news events associated with the geographical region of the culture of destination. The processor may adjust the cultural distance score based on the time-based elements and knowledge-based elements. The time-based elements and knowledge-based elements may be updated periodically by the processor.

At operation 414, the processor causes a display of the cultural distance score on a user interface of a client device 104. For some embodiments, after operation 414, the operations of method 400 continue with operation 416, as illustrated in FIG. 4B.

Figure 7:
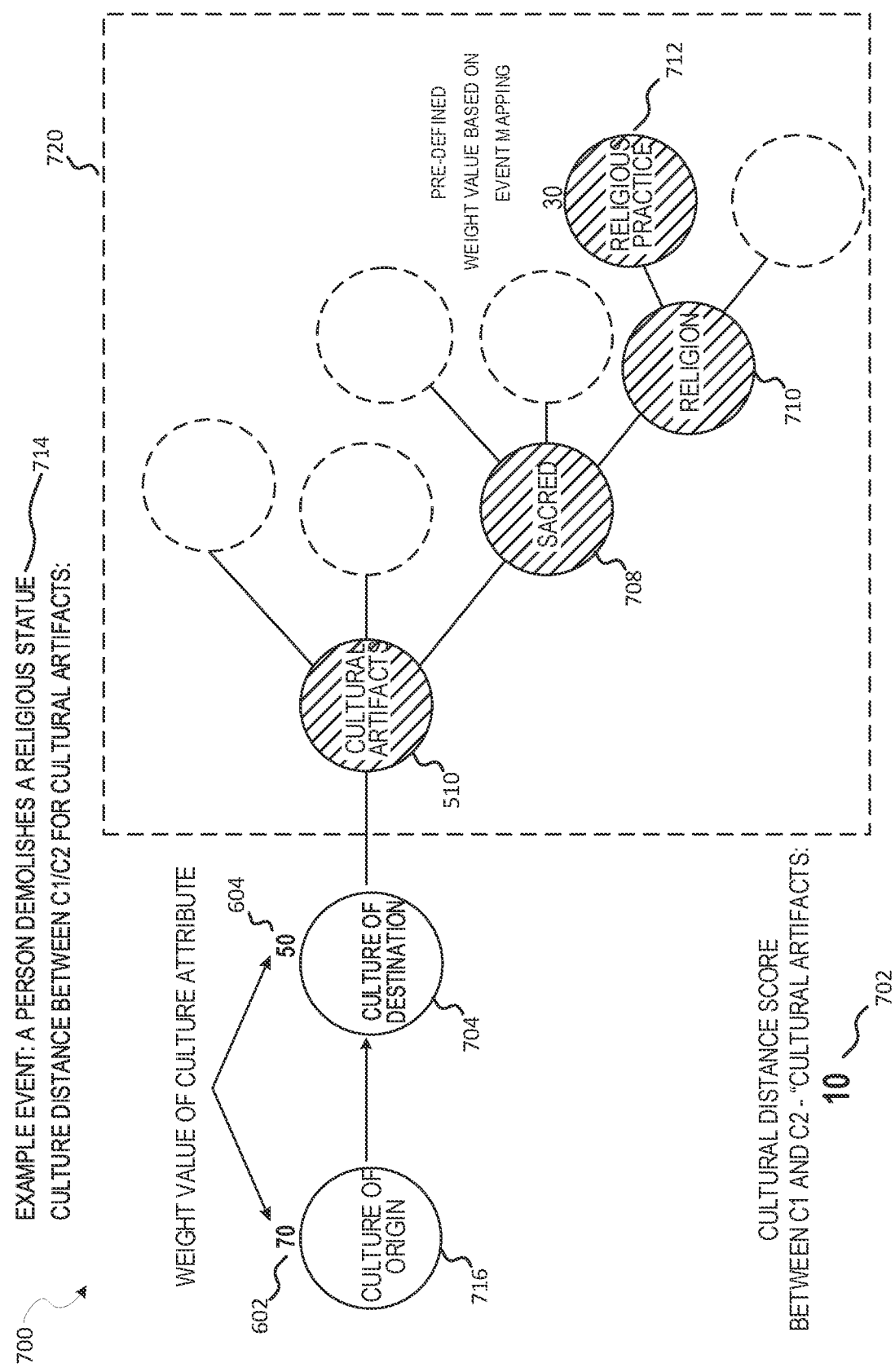
FIG. 7 illustrates an example customized cultural attribute graph generated based on an example event, for an example geographical region, according to various embodiments.

At operation 416, the processor identifies a weight value (e.g., a third weight value) based on the context data of the event. The context or contextual data describes content of the event. For some embodiments, contextual data of an event or a media asset is generated based on at least one of the events, scenes, themes, tropes, genres, or subgenres identified for the media asset. The third weight value may be a cultural attribute (category) that corresponds to a subclass or subcategory of the cultural attribute category as described in operations 404-410. The third weight value of the cultural attribute (category) is associated with the second geographical region and may be determined based on a customized cultural attribute graph (e.g., such as the cultural attribute graph as illustrated in FIG. 7) generated for the event based on cultural attributes relevant to the second geographical region. For some embodiments, the cultural attribute (category) associated with the third weight value, as determined based on context data of the event, is a more relevant cultural attribute (category) to the event compared to the culture attribute category as described in operations 404-410.

At operation 418, the processor applies the weight value (e.g., first weight value) corresponds to a cultural attribute category associated with the geographical region of the culture of origin and the weight value (e.g., second weight value) to the third weight value to generate the cultural distance score for the event. For some embodiments, operation 418 may be performed via any one of the machine learning algorithms as described herein.

At operation 420, after the cultural distance score is caused to be displayed on the user interface on the client device 102, the process may receive a feedback score from the client device 102 or from a system administrator of the cultural distance prediction system 200.

At operation 422, the processor determines a difference between the feedback score and the cultural distance score. The difference may be represented by a difference in the values of such scores. A larger difference indicates a larger possibility that the cultural distance score deviates from a score expected to be generated. For some embodiments, the differences between the weight value (e.g., first weight value) corresponds to the cultural attribute category of the culture of origin and the weight value (e.g., second weight value) corresponds to the cultural attribute category of the culture of destination indicates a scaled range of a cultural distance score for a particular event, scene, theme, trope, genre, and subgenre.

At operation 424, the process adjusts the machine learning algorithm based on the difference. For some embodiments, a machine learning algorithm may be adjusted by determining a weight value (e.g., third weight value) corresponding to a cultural attribute (category) that is more relevant or appropriate based on context data of the event. For example, when an identified event relates to a person demolishes a religious statute, depending on the context data of such event, cultural attribute (category) "religious practice" may be a more relevant attribute compared to "religion," or "religious festival." Since each cultural attribute (category) may be associated with a different pre-determined absolute weight value. Identification of the most relevant attribute (category) associated with each event, scene, theme, trope, genre, and subgenre may affect the accuracy of cultural distance prediction. Cultural attribute and cultural attribute category are used interchangeably as a cultural attribute under a cultural attribute category may itself be a category that comprises multiple attributes and or attribute categories.

FIG. 5 provides a block diagram illustrating example cultural attribute categories in a multi-dimensional hierarchy of cultural attributes based on a predetermined cultural attributes classification ontology/taxonomy, according to various embodiments. The cultural attributes classification ontology/taxonomy includes cultural attribute categories, as illustrated, such as cultural artifacts 510, life milestones 520, interpersonal dynamics 530, social influence 540, moral values 550, protectionism 560, and global standing 570. A customized cultural attribute graph may be generated for each identified event, scene, theme, genre, and subgenre based on the predetermined cultural attributes classification ontology/taxonomy.

Cultural artifacts 510 pertain to items created by humans, which gives information about the culture of its creator and users. Subclasses of Cultural Artifacts may include material, symbolic, and sacred.

Life milestones 520 pertain to events that highlight important achievements in a person's life. Subclasses of life milestones may include birth, gaining independence, falling in love, marriage, higher education, securing a job, buying real property, experiencing loss, and death.

Interpersonal dynamics 530 pertain to interactions among members in a specific social context and their treatment of one another. Subclasses of interpersonal dynamics may include egalitarianism, patriarchy, power, gender, and communication.

Social influence 540 pertains to ways in which individuals change their behavior to meet the demands of a social environment. Subclasses of social influence may include societal norms, peer pressure, imitable behavior, social trust, and threats.

Moral values 550 pertain to the system of beliefs that emerge from core values. Morals are specific and context-driven rules that govern a person's thoughts, emotions, actions, and behavior, such as integrity, honesty, helping others in need, valuing others' time, etc. Subclasses of moral values may include rituals, religion, parenting, child development, and institutions.

Protectionism 560 pertains to policies of protecting domestic industries and culture against foreign competition and culture mixing (contamination). Subclasses of protectionism may include government, politics, military, and history Global standing 570 pertains to a country's approval rating with respect to its reputation as perceived by other nations. Subclasses of global standing may include geolocation, language, economy, regulatory constraints, technology, and environment.

Figure 6:
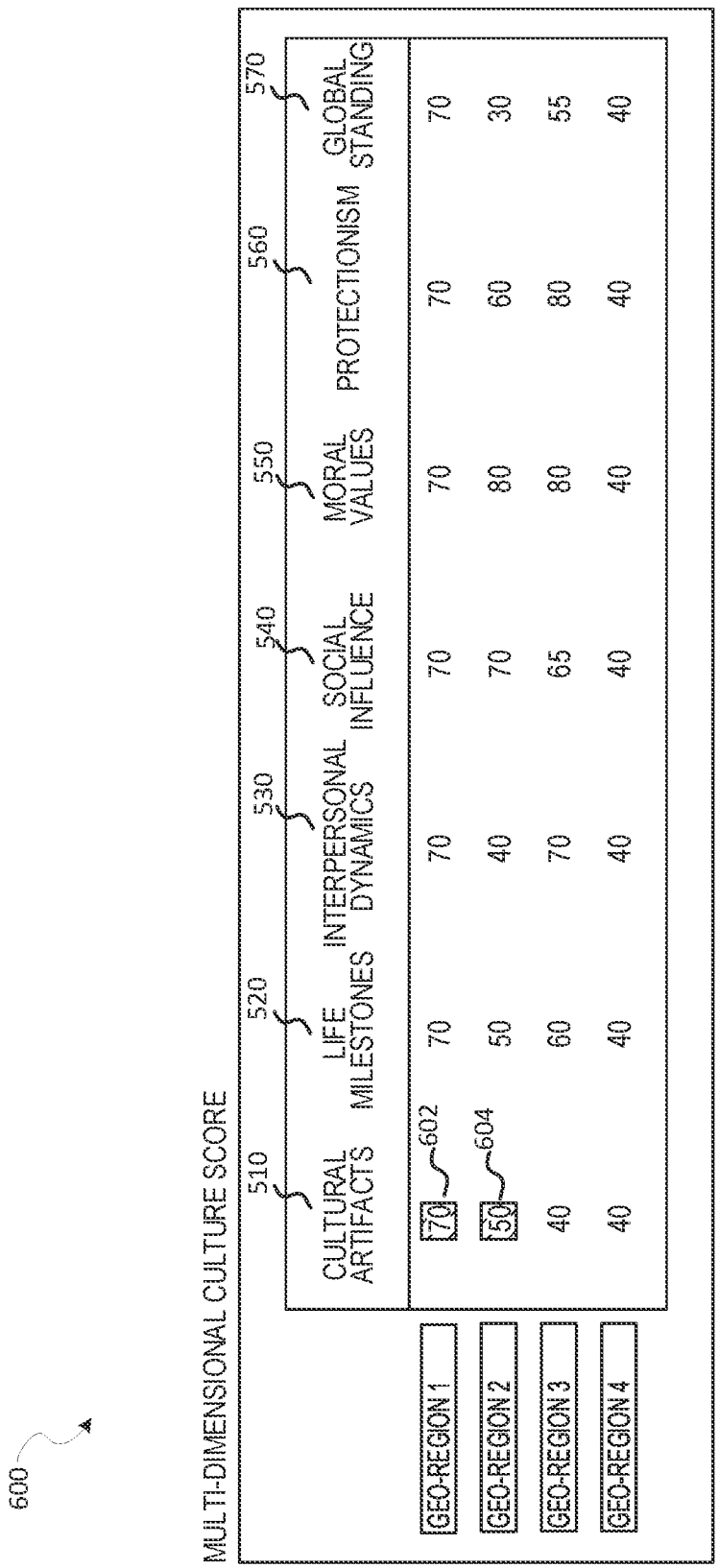
FIG. 6 illustrates an example set of weight values predetermined for cultural attribute categories for each geographical region, according to various embodiments.

FIG. 6 illustrates an example set of weight values pre-determined for cultural attribute categories for each geographical region, according to various embodiments. For some embodiments, the weight value (e.g., the first weight value) of the cultural attribute category cultural artifacts 510 for geographical region 1 is pre-determined as 70 (e.g., weight value 602). The weight value (e.g., the second weight value) of the same cultural attribute category cultural artifacts 510 for geographical region 2 is pre-determined as 50 (e.g., weight value 604). For some embodiments, weight values of cultural attribute categories and the associated cultural attributes are pre-determined absolute values that are accessible by the cultural distance prediction system 200. The weight values may be updated based on time metadata and knowledge graph, as described herein.

FIG. 7 illustrates an example customized cultural attribute graph generated based on an example event for an example geographical region, according to various embodiments. In FIG. 7, a customized attribute graph 720 is generated for an identified event 714 "a person demolished a religious statute," for a geographical region corresponding to the culture of destination 704. The customized attribute graph 720 includes a cultural attribute category 510, a cultural attribute category 708, a cultural attribute category 710, and a cultural attribute (category) 712. The cultural attribute (category) 712 may comprise plural culture attributes as end nodes, or may itself be a culture attribute as an end node in the customized attribute graph 720. The cultural distance prediction system 200 determines, based on context data of the event 714, that the cultural attribute (category) 712 is the most relevant to the event 714. The cultural distance prediction system 200 accesses the weight value 30 (e.g., the third weight value) of the cultural attribute (category) 712, and determines the cultural distance score in conjunction with the weight value 602 of the cultural attribute category 510 corresponding to the culture of origin 716, and the weight value 604 of the cultural attribute category 510 corresponding to the culture of destination 704. The cultural distance score for the event 714 is determined to be 10 (cultural distance score 702), as illustrated in FIG. 7. The determination of cultural distance score may be based on any one of the machine learning algorithms, including without limitation, decision tree algorithm, random forest algorithm, graph neural network algorithm, matrix factorization algorithm, logistic regression algorithm, or scalable vector machines algorithm.

FIG. 8 illustrates an example graphical user interface 800 showing an example cultural distance score generated for a media asset and example scores generated for an event, scene, theme, and genre of the media asset, according to various embodiments. The graphical user interface 800 enables a user to view or edit one or more cultural distance scores associated with a media asset and the associated event, scene, theme, and genre. As illustrated in the graphical user interface 800, the cultural distance score 702 generated for the event 714 is 10. The overall cultural distance score generated for the media asset between the culture of origin (C1) and the culture of destination (C2) is 19, corresponding to the "congruent" distance scale. A distance scale is utilized to indicate the level of cultural distance between two geographical regions with respect to a media asset, or an event, scene, theme, trope, genre, or subgenre associated therewith. The distance scale indicates levels, such as congruent (0-20), complementary (21-40), convergent (41-60), conflicting (61-80), and combustible (81-100). A greater value indicates a greater difference between cultures.

Figure 9:
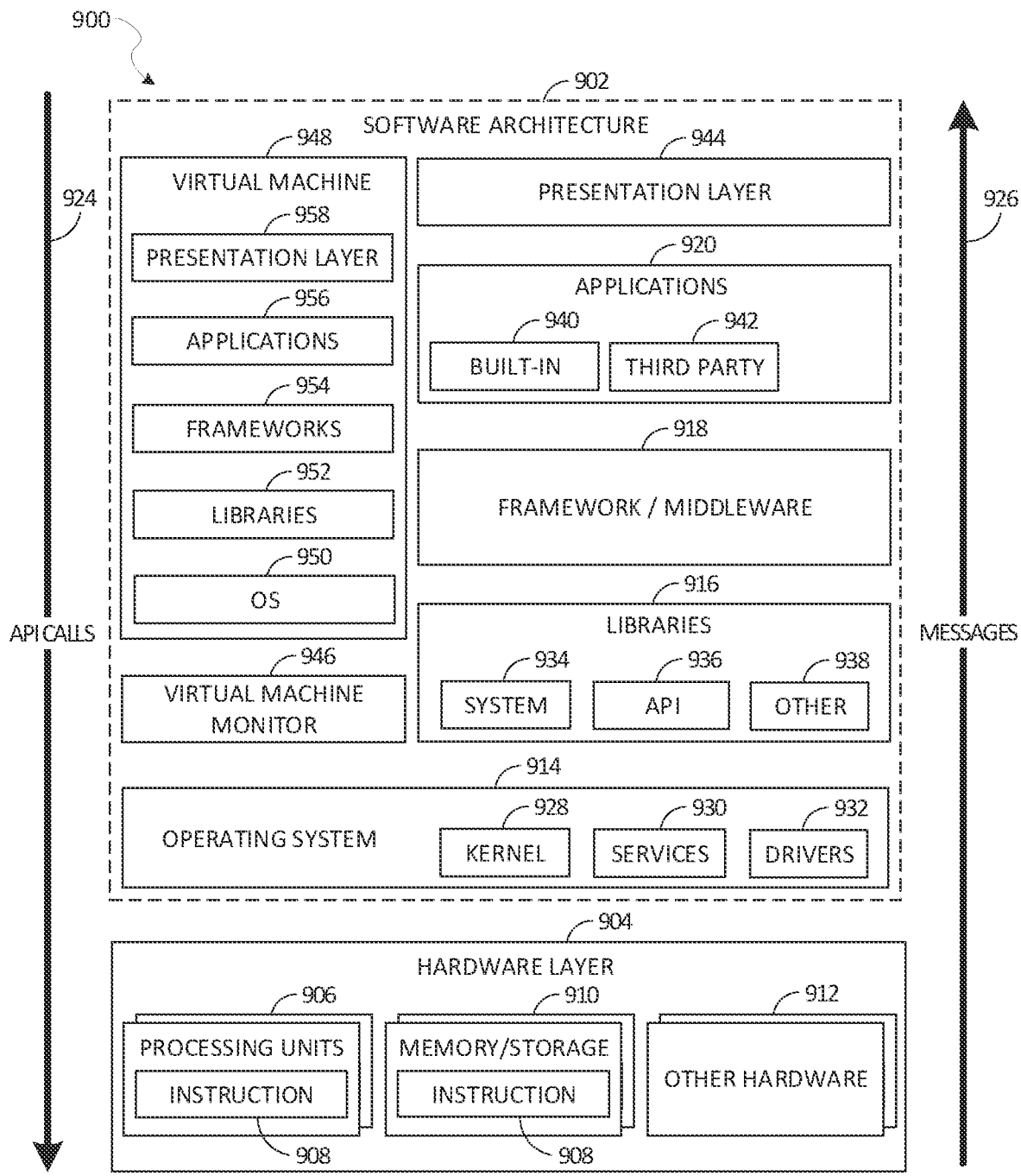
FIG. 9 is a block diagram illustrating a representative software architecture, which may be used in conjunction with various hardware architectures herein described, according to various embodiments.

FIG. 9 is a block diagram illustrating an example of a software architecture 902 that may be installed on a machine, according to some example embodiments. FIG. 9 is merely a non-limiting example of a software architecture, and it will be appreciated that many other architectures may be implemented to facilitate the functionality described herein. The software architecture 902 may be executing on hardware such as a machine 1000 of FIG. 10 that includes, among other things, processors 1010, memory 1030, and input/output (I/O) components 1050. A representative hardware layer 904 is illustrated and can represent, for example, the machine 1000 of FIG. 10. The representative hardware layer 904 comprises one or more processing units 906 having associated executable instructions 908. The executable instructions 908 represent the executable instructions of the software architecture 902. The hardware layer 904 also includes memory or storage modules 910, which also have the executable instructions 908. The hardware layer 904 may also comprise other hardware 912, which represents any other hardware of the hardware layer 904, such as the other hardware illustrated as part of the machine 1000.

In the example architecture of FIG. 9, the software architecture 902 may be conceptualized as a stack of layers, where each layer provides particular functionality. For example, the software architecture 902 may include layers such as an operating system 914, libraries 916, frameworks/middleware 918, applications 920, and a presentation layer 944. Operationally, the applications 920 or other components within the layers may invoke API calls 924 through the software stack and receive a response, returned values, and so forth (illustrated as messages 926) in response to the API calls 924. The layers illustrated are representative in nature, and not all software architectures have all layers. For example, some mobile or special-purpose operating systems may not provide a frameworks/middleware 918 layer, while others may provide such a layer. Other software architectures may include additional or different layers.

The operating system 914 may manage hardware resources and provide common services. The operating system 914 may include, for example, a kernel 928, services 930, and drivers 932. The kernel 928 may act as an abstraction layer between the hardware and the other software layers. For example, the kernel 928 may be responsible for memory management, processor management (e.g., scheduling), component management, networking, security settings, and so on. The services 930 may provide other common services for the other software layers. The drivers 932 may be responsible for controlling or interfacing with the underlying hardware. For instance, the drivers 932 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 916 may provide a common infrastructure that may be utilized by the applications 920 and/or other components and/or layers. The libraries 916 typically provide functionality that allows other software modules to perform tasks in an easier fashion than by interfacing directly with the underlying operating system 914 functionality (e.g., kernel 928, services 930, or drivers 932). The libraries 916 may include system libraries 934 (e.g., C standard library) that may provide functions such as memory allocation functions, string manipulation functions, mathematic functions, and the like. In addition, the libraries 916 may include API libraries 936 such as media libraries (e.g., libraries to support presentation and manipulation of various media formats such as MPEG4, H.264, MP3, AAC, AMR, JPG, and PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 916 may also include a wide variety of other libraries 938 to provide many other APIs to the applications 920 and other software components/modules.

The frameworks 918 (also sometimes referred to as middleware) may provide a higher-level common infrastructure that may be utilized by the applications 920 or other software components/modules. For example, the frameworks 918 may provide various graphical user interface functions, high-level resource management, high-level location services, and so forth. The frameworks 918 may provide a broad spectrum of other APIs that may be utilized by the applications 920 and/or other software components/modules, some of which may be specific to a particular operating system or platform.

The applications 920 include built-in applications 940 and/or third-party applications 942. Examples of representative built-in applications 940 may include, but are not limited to, a home application, a contacts application, a browser application, a book reader application, a location application, a media application, a messaging application, or a game application.

The third-party applications 942 may include any of the built-in applications 940, as well as a broad assortment of other applications. In a specific example, the third-party applications 942 (e.g., an application developed using the Android™ or iOS™ software development kit (SDK) by an entity other than the vendor of the particular platform) may be mobile software running on a mobile operating system such as iOS™, Android™, or other mobile operating systems. In this example, the third-party applications 942 may invoke the API calls 924 provided by the mobile operating system such as the operating system 914 to facilitate functionality described herein.

The applications 920 may utilize built-in operating system functions (e.g., kernel 928, services 930, or drivers 932), libraries (e.g., system libraries 934, API libraries 936, and other libraries 938), or frameworks/middleware 918 to create user interfaces to interact with users of the system. Alternatively, or additionally, in some systems, interactions with a user may occur through a presentation layer, such as the presentation layer 944. In these systems, the application/module "logic" can be separated from the aspects of the application/module that interact with the user.

Some software architectures utilize virtual machines. In the example of FIG. 9, this is illustrated by a virtual machine 948. The virtual machine 948 creates a software environment where applications/modules can execute as if they were executing on a hardware machine (e.g., the machine 1000 of FIG. 10). The virtual machine 948 is hosted by a host operating system (e.g., the operating system 914) and typically, although not always, has a virtual machine monitor 946, which manages the operation of the virtual machine 948 as well as the interface with the host operating system (e.g., the operating system 914). A software architecture executes within the virtual machine 948, such as an operating system 950, libraries 952, frameworks/middleware 954, applications 956, or a presentation layer 958. These layers of software architecture executing within the virtual machine 948 can be the same as corresponding layers previously described or may be different.

Figure 10:
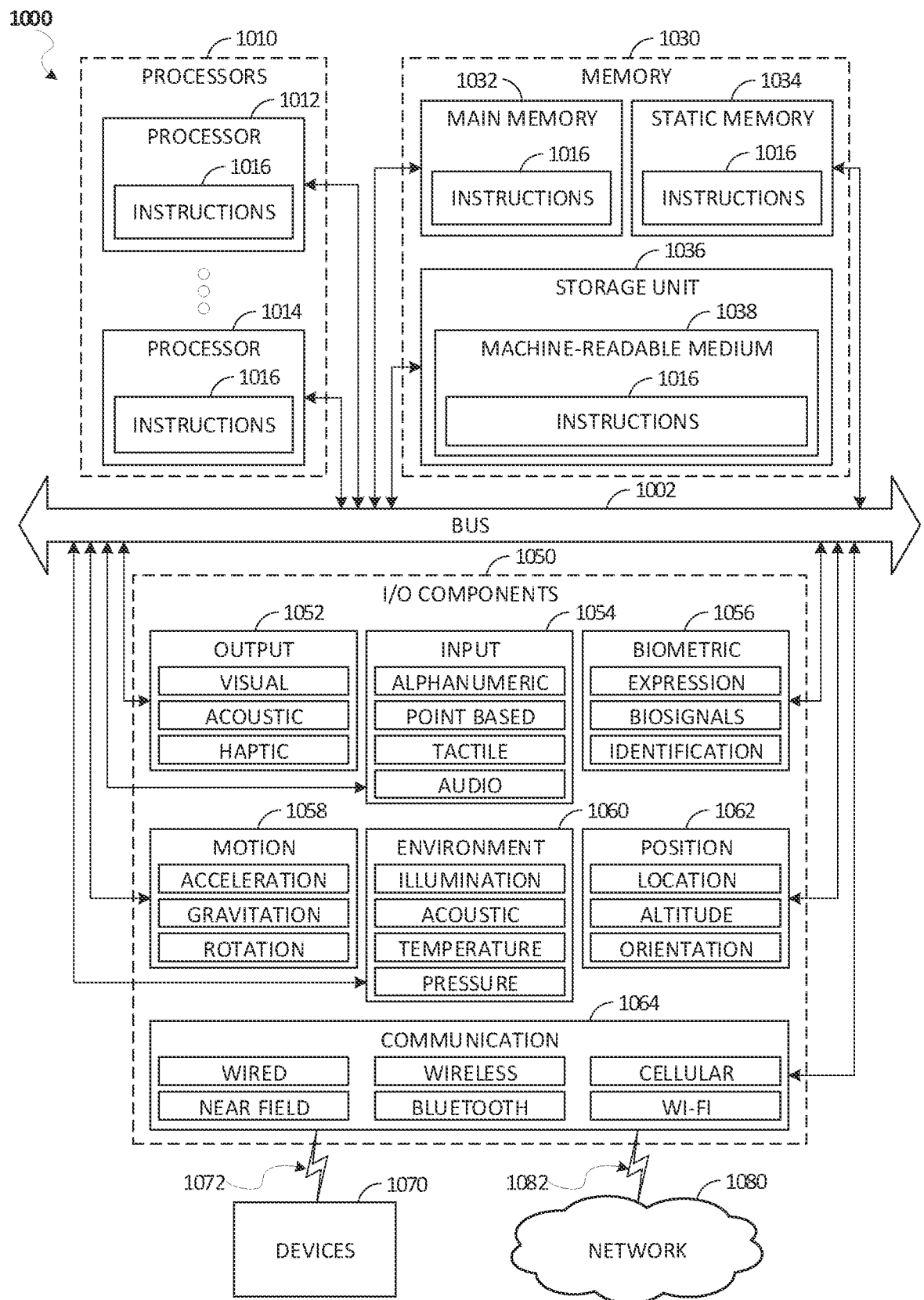
FIG. 10 is a block diagram illustrating components of a machine able to read instructions from a machine storage medium and perform any one or more of the methodologies discussed herein according to various embodiments.

FIG. 10 illustrates a diagrammatic representation of a machine 1000 in the form of a computer system within which a set of instructions may be executed for causing the machine 1000 to perform any one or more of the methodologies discussed herein, according to an embodiment. Specifically, FIG. 10 shows a diagrammatic representation of the machine 1000 in the example form of a computer system, within which instructions 1016 (e.g., software, a program, an application, an applet, an app, or other executable code) for causing the machine 1000 to perform any one or more of the methodologies discussed herein may be executed. For example, the instructions 1016 may cause the machine 1000 to execute the method 400 described above with respect to FIGS. 4A-4B. The instructions 1016 transform the general, non-programmed machine 1000 into a particular machine 1000 programmed to carry out the described and illustrated functions in the manner described. In alternative embodiments, the machine 1000 operates as a standalone device or may be coupled (e.g., networked) to other machines. In a networked deployment, the machine 1000 may operate in the capacity of a server machine or a client machine in a server-client network environment, or as a peer machine in a peer-to-peer (or distributed) network environment. The machine 1000 may comprise, but not be limited to, a server computer, a client computer, a personal computer (PC), a tablet computer, a laptop computer, a netbook, a personal digital assistant (PDA), an entertainment media system, a cellular telephone, a smart phone, a mobile device, or any machine capable of executing the instructions 1016, sequentially or otherwise, that specify actions to be taken by the machine 1000. Further, while only a single machine 1000 is illustrated, the term "machine" shall also be taken to include a collection of machines 1000 that individually or jointly execute the instructions 1016 to perform any one or more of the methodologies discussed herein.

The machine 1000 may include processors 1010, memory 1030, and I/O components 1050, which may be configured to communicate with each other such as via a bus 1002. In an embodiment, the processors 1010 (e.g., a hardware processor, such as a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 1012 and a processor 1014 that may execute the instructions 1016. The term "processor" is intended to include multi-core processors that may comprise two or more independent processors (sometimes referred to as "cores") that may execute instructions contemporaneously. Although FIG. 10 shows multiple processors 1010, the machine 1000 may include a single processor with a single core, a single processor with multiple cores (e.g., a multi-core processor), multiple processors with a single core, multiple processors with multiples cores, or any combination thereof.

The memory 1030 may include a main memory 1032, a static memory 1034, and a storage unit 1036 including machine-readable medium 1038, each accessible to the processors 1010 such as via the bus 1002. The main memory 1032, the static memory 1034, and the storage unit 1036 store the instructions 1016 embodying any one or more of the methodologies or functions described herein. The instructions 1016 may also reside, completely or partially, within the main memory 1032, within the static memory 1034, within the storage unit 1036, within at least one of the processors 1010 (e.g., within the processor's cache memory), or any suitable combination thereof, during execution thereof by the machine 1000.

The I/O components 1050 may include a wide variety of components to receive input, provide output, produce output, transmit information, exchange information, capture measurements, and so on. The specific I/O components 1050 that are included in a particular machine will depend on the type of machine. For example, portable machines such as mobile phones will likely include a touch input device or other such input mechanisms, while a headless server machine will likely not include such a touch input device. It will be appreciated that the I/O components 1050 may include many other components that are not shown in FIG. 10. The I/O components 1050 are grouped according to functionality merely for simplifying the following discussion, and the grouping is in no way limiting. In various embodiments, the I/O components 1050 may include output components 1052 and input components 1054. The output components 1052 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1054 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further embodiments, the I/O components 1050 may include biometric components 1056, motion components 1058, environmental components 1060, or position components 1062, among a wide array of other components. The motion components 1058 may include acceleration sensor components (e.g., accelerometer), gravitation sensor components, rotation sensor components (e.g., gyroscope), and so forth. The environmental components 1060 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 1062 may include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1050 may include communication components 1064 operable to couple the machine 1000 to a network 1080 or devices 1070 via a coupling 1082 and a coupling 1072, respectively. For example, the communication components 1064 may include a network interface component or another suitable device to interface with the network 1080. In further examples, the communication components 1064 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 1070 may be another machine or any of a wide variety of peripheral devices (e.g., a peripheral device coupled via a USB).

Moreover, the communication components 1064 may detect identifiers or include components operable to detect identifiers. For example, the communication components 1064 may include radio frequency identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1064, such as location via Internet Protocol (IP) geolocation, location via Wi-Fi® signal triangulation, location via detecting an NFC beacon signal that may indicate a particular location, and so forth.

Certain embodiments are described herein as including logic or a number of components, modules, elements, or mechanisms. Such modules can constitute either software modules (e.g., code embodied on a machine-readable medium or in a transmission signal) or hardware modules. A "hardware module" is a tangible unit capable of performing certain operations and can be configured or arranged in a certain physical manner. In various example embodiments, one or more computer systems (e.g., a standalone computer system, a client computer system, or a server computer system) or one or more hardware modules of a computer system (e.g., a processor or a group of processors) are configured by software (e.g., an application or application portion) as a hardware module that operates to perform certain operations as described herein.

In some embodiments, a hardware module is implemented mechanically, electronically, or any suitable combination thereof. For example, a hardware module can include dedicated circuitry or logic that is permanently configured to perform certain operations. For example, a hardware module can be a special-purpose processor, such as a field-programmable gate array (FPGA) or an ASIC. A hardware module may also include programmable logic or circuitry that is temporarily configured by software to perform certain operations. For example, a hardware module can include software encompassed within a general-purpose processor or other programmable processor. It will be appreciated that the decision to implement a hardware module mechanically, in dedicated and permanently configured circuitry, or in temporarily configured circuitry (e.g., configured by software) can be driven by cost and time considerations.

Accordingly, the phrase "module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software can accordingly configure a particular processor or processors, for example, to constitute a particular hardware module at one instance of time and to constitute a different hardware module at a different instance of time.

Hardware modules can provide information to, and receive information from, other hardware modules. Accordingly, the described hardware modules can be regarded as being communicatively coupled. Where multiple hardware modules exist contemporaneously, communications can be achieved through signal transmission (e.g., over appropriate circuits and buses) between or among two or more of the hardware modules. In embodiments in which multiple hardware modules are configured or instantiated at different times, communications between or among such hardware modules may be achieved, for example, through the storage and retrieval of information in memory structures to which the multiple hardware modules have access. For example, one hardware module performs an operation and stores the output of that operation in a memory device to which it is communicatively coupled. A further hardware module can then, at a later time, access the memory device to retrieve and process the stored output. Hardware modules can also initiate communications with input or output devices, and can operate on a resource (e.g., a collection of information).

The various operations of example methods described herein can be performed, at least partially, by one or more processors that are temporarily configured (e.g., by software) or permanently configured to perform the relevant operations. Whether temporarily or permanently configured, such processors constitute processor-implemented modules that operate to perform one or more operations or functions described herein. As used herein, "processor-implemented module" refers to a hardware module implemented using one or more processors.

Similarly, the methods described herein can be at least partially processor-implemented, with a particular processor or processors being an example of hardware. For example, at least some of the operations of a method can be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines 1000 including processors 1010), with these operations being accessible via a network (e.g., the Internet) and via one or more appropriate interfaces (e.g., an API). In certain embodiments, for example, a client device may relay or operate in communication with cloud computing systems, and may access circuit design information in a cloud environment.

The performance of certain of the operations may be distributed among the processors, not only residing within a single machine 1000, but deployed across a number of machines 1000. In some example embodiments, the processors 1010 or processor-implemented modules are located in a single geographic location (e.g., within a home environment, an office environment, or a server farm). In other example embodiments, the processors or processor-implemented modules are distributed across a number of geographic locations.

Executable Instructions and Machine Storage Medium

The various memories (i.e., 1030, 1032, 1034, and/or the memory of the processor(s) 1010) and/or the storage unit 1036 may store one or more sets of instructions 1016 and data structures (e.g., software) embodying or utilized by any one or more of the methodologies or functions described herein. These instructions (e.g., the instructions 1016), when executed by the processor(s) 1010, cause various operations to implement the disclosed embodiments.

As used herein, the terms "machine-storage medium," "device-storage medium," and "computer-storage medium" mean the same thing and may be used interchangeably. The terms refer to a single or multiple storage devices and/or media (e.g., a centralized or distributed database, and/or associated caches and servers) that store executable instructions 1016 and/or data. The terms shall accordingly be taken to include, but not be limited to, solid-state memories, and optical and magnetic media, including memory internal or external to processors. Specific examples of machine-storage media, computer-storage media and/or device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

Transmission Medium

In various embodiments, one or more portions of the network 1080 may be an ad hoc network, an intranet, an extranet, a virtual private network (VPN), a LAN, a wireless LAN (WLAN), a WAN, a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 1080 or a portion of the network 1080 may include a wireless or cellular network, and the coupling 1082 may be a Code Division Multiple Access (CDMA) connection, a Global System for Mobile communications (GSM) connection, or another type of cellular or wireless coupling. In this example, the coupling 1082 may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

The instructions may be transmitted or received over the network using a transmission medium via a network interface device (e.g., a network interface component included in the communication components) and utilizing any one of a number of well-known transfer protocols (e.g., hypertext transfer protocol (HTTP)). Similarly, the instructions may be transmitted or received using a transmission medium via the coupling (e.g., a peer-to-peer coupling) to the devices 1070. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions for execution by the machine, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

Computer-Readable Medium

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals. For instance, an embodiment described herein can be implemented using a non-transitory medium (e.g., a non-transitory computer-readable medium).

Throughout this specification, plural instances may implement resources, components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components.

As used herein, the term "or" may be construed in either an inclusive or exclusive sense. The terms "a" or "an" should be read as meaning "at least one," "one or more," or the like. The presence of broadening words and phrases such as "one or more," "at least," "but not limited to," or other like phrases in some instances shall not be read to mean that the narrower case is intended or required in instances where such broadening phrases may be absent. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments. The specification and drawings are, accordingly, to be regarded in an illustrative rather than a restrictive sense.

It will be understood that changes and modifications may be made to the disclosed embodiments without departing from the scope. These and other changes or modifications are intended to be included within the scope.

What is claimed is:

1. A method comprising:
   determining, by a hardware processor, an event at a timestamp within content data of a media asset, the event being relevant to a cultural attribute category;
   identifying, by the hardware processor, a first geographical region corresponding to a culture of origin of the media asset and a second geographical region corresponding to a culture of destination of the media asset, the first geographical region being where content of the media asset was created, the second geographical region being where the media asset is targeted for release to an audience;
   accessing, by the hardware processor, a first weight value of the cultural attribute category associated with the first geographical region;
   accessing, by the hardware processor, a second weight value of the cultural attribute category associated with the second geographical region;
   using machine learning algorithm to generate, by the hardware processor, a cultural distance score of the event based on the first weight value, the second weight value, and context data of the event;
   classifying, by the hardware processor, the content data of the media asset based on a plurality of cultural distance scores corresponding to a plurality of events within the content data of the media asset, the plurality of cultural distance scores including the cultural distance score of the event; and
   based on the plurality of cultural distance scores, generating, by the hardware processor, an age rating value for the media asset for a local market associated with the second geographical region.

2. The method of claim 1, wherein at least one of the first weight value and the second weight value is accessed from a cultural attribute graph that comprises cultural attributes associated with pre-determined weight values.

3. The method of claim 1, wherein the using of the machine learning algorithm to generate the cultural distance score of the event based on the first weight value, the second weight value, and the context data of the event comprising:
   determining a third weight value of the cultural attribute category associated with the second geographical region based on the context data of the event; and
   applying the first weight value and the second weight value to the third weight value to generate the cultural distance score of the event using the machine learning algorithm.

4. The method of claim 1, comprising:
   determining the context data of the event based on the content data of the media asset.

5. The method of claim 1, wherein the machine learning algorithm comprises at least one of a decision tree algorithm, a random forest algorithm, a graph neural network (GNN)

algorithm, or a matrix factorization algorithm, and wherein the machine learning algorithm corresponds to a representation learning framework.

6. The method of claim 1, comprising:
causing display of the cultural distance score of the media asset on a user interface of a client device;
after the cultural distance score is displayed on the user interface on the client device, receiving a feedback score from the client device;
determining a difference between the feedback score and the cultural distance score; and
adjusting the machine learning algorithm based on the difference.

7. The method of claim 1, comprising:
determining a level of predicted appeal of the event by the audience of the culture of destination based on a value of the cultural distance score.

8. The method of claim 1, comprising:
determining an element of the media asset based on the content data;
generating a second cultural distance score by applying a machine learning algorithm to the element based on the first weight value and the second weight value, the cultural distance score being a first cultural distance score; and
adjusting the first cultural distance score of the media asset based on the second cultural distance score.

9. The method of claim 8, wherein the element is a theme or a genre of the media asset.

10. The method of claim 1, wherein the media asset is a video content item or an audio content item.

11. The method of claim 1, comprising:
accessing metadata associated with the media asset, the metadata including a time-based element of the media asset; and
adjusting the cultural distance score based on the time-based element.

12. The method of claim 11, wherein the time-based element comprises at least one of a production year, an original release year, a consumption date, or a time period of content of the media asset.

13. The method of claim 1, comprising:
accessing metadata associated with the media asset, the metadata including a geographical knowledge-based element of the second geographical region; and
adjusting the cultural distance score based on the geographical knowledge-based element.

14. The method of claim 13, wherein the geographical knowledge-based element corresponds to at least one of a current policy, a law, or a news event associated with the second geographical region.

15. The method of claim 14, comprising:
detecting a change to the geographical knowledge-based element; and
updating the second weight value of the cultural attribute category associated with the second geographical region based on the change to the geographical knowledge-based element.

16. A system comprising:
a memory storing instructions; and
one or more hardware processors communicatively coupled to the memory and configured by the instructions to perform operations comprising:
determining an event at a timestamp within content data of a media asset, the event being relevant to a cultural attribute category;
identifying a first geographical region corresponding to a culture of origin of the media asset and a second geographical region corresponding to a culture of destination of the media asset, the first geographical region being where content of the media asset was created, the second geographical region being where the media asset is targeted for release to an audience;
accessing a first weight value of the cultural attribute category associated with the first geographical region;
accessing a second weight value of the cultural attribute category associated with the second geographical region;
using machine learning algorithm to generate a cultural distance score of the event based on the first weight value, the second weight value, and context data of the event;
classifying the content data of the media asset based on a plurality of cultural distance scores corresponding to a plurality of events within the content data of the media asset, the plurality of cultural distance scores including the cultural distance score of the event; and
based on the plurality of cultural distance scores, generating an age rating value for the media asset for a local market associated with the second geographical region.

17. The system of claim 16, wherein at least one of the first weight value and the second weight value is accessed from a cultural attribute graph that comprises cultural attributes associated with pre-determined weight values.

18. The system of claim 16, wherein the using of the machine learning algorithm to generate the cultural distance score of the event based on the first weight value, the second weight value, and the context data of the event comprising:
determining a third weight value of the cultural attribute category associated with the second geographical region based on the context data of the event; and
applying the first weight value and the second weight value to the third weight value to generate the cultural distance score of the event using the machine learning algorithm.

19. The system of claim 16, wherein the operations comprise:
causing display of the cultural distance score of the media asset on a user interface of a client device;
after the cultural distance score is displayed on the user interface on the client device, receiving a feedback score from the client device;
determining a difference between the feedback score and the cultural distance score; and
adjusting the machine learning algorithm based on the difference.

20. A non-transitory computer-readable medium comprising instructions that, when executed by a hardware processor of a device, cause the device to perform operations comprising:
determining an event at a timestamp within content data of a media asset, the event being relevant to a cultural attribute category;
identifying a first geographical region corresponding to a culture of origin of the media asset and a second geographical region corresponding to a culture of destination of the media asset, the first geographical region being where content of the media asset was created, the second geographical region being where the media asset is targeted for release to an audience;

accessing a first weight value of the cultural attribute category associated with the first geographical region;
accessing a second weight value of the cultural attribute category associated with the second geographical region;
using machine learning algorithm to generate a cultural distance score of the event based on the first weight value, the second weight value, and context data of the event;
classifying the content data of the media asset based on a plurality of cultural distance scores corresponding to a plurality of events within the content data of the media asset, the plurality of cultural distance scores including the cultural distance score of the event; and
based on the plurality of cultural distance scores, generating an age rating value for the media asset for a local market associated with the second geographical region.

* * * * *